(12) United States Patent
Kim et al.

(10) Patent No.: US 12,026,339 B2
(45) Date of Patent: Jul. 2, 2024

(54) ELECTRONIC DEVICE, AND METHOD FOR DISPLAYING CONTENT IN ELECTRONIC DEVICE

(71) Applicant: SAMSUNG ELECTRONICS CO., LTD., Suwon-si (KR)

(72) Inventors: Taehoon Kim, Suwon-si (KR); Jinwan An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/126,197

(22) Filed: Mar. 24, 2023

(65) Prior Publication Data

US 2023/0236696 A1 Jul. 27, 2023

Related U.S. Application Data

(63) Continuation of application No. PCT/KR2021/015895, filed on Nov. 4, 2021.

(30) Foreign Application Priority Data

Nov. 25, 2020 (KR) .................. 10-2020-0159603

(51) Int. Cl.
*G06F 3/041* (2006.01)
(52) U.S. Cl.
CPC .............. *G06F 3/04166* (2019.05); *G06F 2203/04102* (2013.01)
(58) Field of Classification Search
None
See application file for complete search history.

(56) References Cited

U.S. PATENT DOCUMENTS

2015/0097755 A1 4/2015 Kim
2016/0057356 A1 2/2016 Nagano et al.
(Continued)

FOREIGN PATENT DOCUMENTS

KR 10-2014-0054498 A 5/2014
KR 10-2014-0144029 A 12/2014
(Continued)

OTHER PUBLICATIONS

International Search Report dated Feb. 9, 2022 issued by the International Searching Authority in International Application No. PCT/KR2021/015895 (PCT/ISA/210).
(Continued)

*Primary Examiner* — Stephen T. Reed
(74) *Attorney, Agent, or Firm* — Sughrue Mion, PLLC

(57) ABSTRACT

An electronic device a flexible display including a first area and a second area extending from the first area, the second area being configured to be inserted into an inside of a housing of the electronic device or exposed to an outside of the housing; and a processor configured to, based on detecting an enlarge event or a shrink event on the display while displaying content on the display in a state in which the first area is exposed and the second area is inserted in or exposed from the housing, resize the display by exposing the second area according to an enlarging ratio corresponding to the enlarge event or inserting the second area according to an shrinking ratio corresponding to the shrink event, and display content resized according to in the enlarging ratio or the shrinking ratio on the resized display.

12 Claims, 17 Drawing Sheets

(56) References Cited

U.S. PATENT DOCUMENTS

| | | | |
|---|---|---|---|
| 2016/0112667 A1 | 4/2016 | Park et al. | |
| 2016/0306534 A1* | 10/2016 | Woo | G09G 5/373 |
| 2017/0359504 A1 | 12/2017 | Manzari et al. | |
| 2018/0275770 A1* | 9/2018 | Kang | G09G 3/20 |
| 2019/0197960 A1 | 6/2019 | Kim | |
| 2019/0261519 A1 | 8/2019 | Park et al. | |
| 2020/0050285 A1 | 2/2020 | Kwon et al. | |

FOREIGN PATENT DOCUMENTS

| | | |
|---|---|---|
| KR | 10-2015-0040553 A | 4/2015 |
| KR | 10-2016-0150533 A | 12/2016 |
| KR | 10-2017-0062121 A | 6/2017 |
| KR | 10-2018-0108847 A | 10/2018 |
| KR | 10-2019-0079241 A | 7/2019 |
| KR | 10-2019-0101184 A | 8/2019 |
| KR | 10-2020-0075809 A | 6/2020 |

OTHER PUBLICATIONS

International Written Opinion dated Feb. 9, 2022 issued by the International Searching Authority in International Application No. PCT/KR2021/015895 (PCT/ISA/237).

\* cited by examiner

ELECTRONIC DEVICE, AND METHOD FOR DISPLAYING CONTENT IN ELECTRONIC DEVICE

CROSS-REFERENCE TO RELATED APPLICATIONS

This application is by-pass continuation application of International Application No. PCT/KR2021/015895, filed on Nov. 4, 2021, which based on and claims priority to Korean Patent Application No. 10-2020-0159603, filed on Nov. 25, 2020, in the Korean Intellectual Property Office, the disclosures of which are incorporated by reference herein in their entireties.

BACKGROUND

1. Field

The disclosure relate to an electronic device that resizes a flexible display according to a touch input and displays content and a method for displaying content in the electronic device.

2. Description of Related Art

In an electronic device including a flexible display, a partial area of the flexible display is exposed, and another partial area extending from the partial area may be inserted into the electronic device and then automatically exposed or reinserted from the electronic device by a separate switch input. Further, the other partial area of the flexible display may be exposed to the outside of the electronic device by being pulled by the user or may be inserted into the electronic device by being pushed by the user.

Further, the electronic device may resize the display as the other partial area of the flexible display is inserted into the electronic device or exposed to the outside by a separate switch input or a manual action by the user and may display content on the resized display.

The electronic device having the flexible display merely resizes the display based on an inserting of or an exposing of the other partial area of the display but does not perform an operation of inserting or exposing the other partial area of the display in conjunction with the content displayed on the display.

SUMMARY

According to an aspect of the disclosure, an electronic device includes: a flexible display including a first area and a second area extending from the first area, the second area being configured to be inserted into an inside of a housing of the electronic device or exposed to an outside of the housing; and a processor configured to, based on detecting an enlarge event or a shrink event on the display while displaying content on the display in a state in which the first area is exposed and the second area is inserted in or exposed from the housing, resize the display by exposing the second area according to an enlarging ratio corresponding to the enlarge event or inserting the second area according to an shrinking ratio corresponding to the shrink event, and display content resized according to in the enlarging ratio or the shrinking ratio on the resized display.

The processor may be further configured to, based on the enlarging ratio or the shrinking ratio being a change in a predetermined ratio or more, resize the display by exposing the second area to the outside of the housing or inserting the second area into the inside of the housing.

The processor may be further configured to: based on detecting the enlarge event on the display while displaying the content on the display in a first state in which the first area is exposed and an entirety of the second area is inserted in the housing, switch to a second state of resizing the display by exposing a portion of the second area to the outside of the housing or a third state of resizing the display by exposing the entirety of the second area to the outside of the housing according to the enlarging ratio corresponding to the enlarge event, and display the content enlarged in the enlarging ratio on the resized display in the second state or the third state.

The processor may be further configured to: detect the enlarge event on the display while displaying the content on the display in a first state in which the first area is exposed and an entirety of the second area is inserted in the housing, based on the enlarging ratio corresponding to the enlarge event exceeding a first size corresponding to a total size of the first area and the second area of the display, switch to a third state of resizing the display by exposing the entirety of the second area to the outside of the housing, and display the content enlarged in the enlarging ratio on the resized display in the third state.

The processor may be further configured to: switch to a first capture mode in a first state in which the first area is exposed and an entirety of the second area is inserted in the housing, detect the enlarge event on the display while displaying the content on the display in the first capture mode, and, based on identifying that the enlarging ratio corresponding to the enlarge event is a ratio for a second capture mode among a plurality of capture modes, switch from the first capture mode to the second capture mode, and based on switching to a second state of resizing the display by exposing a portion of the second area to the outside of the housing or a third state of resizing the display by exposing the entirety of the second area to the outside of the housing according to the enlarging ratio corresponding to the enlarge event, display the content enlarged in the enlarging ratio on the resized display in the second capture mode of the second state or the second capture mode of the third state.

The processor may be further configured to: switch to a first capture mode in a first state in which the first area is exposed and an entirety of the second area is inserted in the housing, detect the enlarge event on the display while displaying the content on the display in the first capture mode, and, based on identifying that the enlarging ratio corresponding to the enlarge event is a ratio for a second capture mode among a plurality of capture modes, switch from the first capture mode to the second capture mode, and based on the enlarging ratio exceeding a first size corresponding to a total size of the first area and the second area of the display, switch to a third state of resizing the display by exposing the entirety of the second area to the outside of the housing and display the content enlarged in the enlarging ratio on the resized display in the second capture mode of the third state.

The processor may be further configured to: based on detecting the shrink event on the display while displaying the content on the display in a third state in which the first area is exposed and an entirety of the second area is exposed to the outside of the housing, switch to a second state of resizing the display by inserting a portion of the second area into the inside of the housing or a first state of resizing the display by inserting the entirety of the second area into the inside of the housing according to the shrinking ratio corresponding to the shrink event, and display the content shrunken in the shrinking ratio on the resized display in the second state or the first state.

The processor may be further configured to: detect the shrink event on the display while displaying the content on the display in a third state in which the first area is exposed and an entirety of the second area is exposed to the outside of the housing, and, based on a the ratio corresponding to the shrink event being less than a second size corresponding to a size of an entirety of the first area of the display, switch to a first state of resizing the display by inserting the entirety of the second area into the inside of the housing, and display the content shrunken in the shrinking ratio on the resized display in the first state.

The processor may be further configured to: switch to a second capture mode in a third state in which the first area is exposed and an entirety of the second area is exposed to the outside of the housing, detect the shrink event on the display while displaying the content on the display in the second capture mode, and, based on identifying that the shrinking ratio corresponding to the shrink event is a ratio for a first capture mode among a plurality of capture modes, switch from the second capture mode to the first capture mode, and based on switching to a second state of resizing the display by inserting a portion of the second area into the inside of the housing or a first state of resizing the display by inserting the entirety of the second area into the inside of the housing according to the shrinking ratio, display the content shrunken in the shrinking ratio on the resized display in the first capture mode of the second state or the first capture mode of the first state.

The processor may be further configured to: switch into a second capture mode in a third state in which the first area is exposed and an entirety of the second area is exposed to the outside of the housing, detect the shrink event on the display while displaying the content on the display in the second capture mode, and based on identifying that the shrinking ratio corresponding to the shrink event is a ratio for a first capture mode among a plurality of capture modes, switch from the second capture mode to the first capture mode, and based on the shrinking ratio being less than a second size corresponding to a size of an entirety of the first area of the display, switch to a first state of resizing the display by inserting the entirety of the second area into the inside of the housing and display the content shrunken in the shrinking ratio on the resized display in the first capture mode of the first state.

According to an aspect of the disclosure, a method for displaying content in an electronic device, includes: detecting an enlarge event or a shrink event on a flexible display of the electronic device while displaying content on the display in a state in which a first area of the display is exposed and a second area of the display is inserted in or exposed from a housing of the electronic device; resizing the display by exposing or inserting the second area according to an enlarging ratio corresponding to the enlarge event or a shrinking ratio corresponding to the shrink event; and displaying content resized according to the enlarging ratio or the shrinking ratio on the resized display.

The method may further include: detecting the enlarge event on the display while displaying the content on the display in a first state in which the first area is exposed and an entirety of the second area is inserted in the housing; switching to a second state of resizing the display by exposing a portion of the second area to the outside of the housing or a third state of resizing the display by exposing the entirety of the second area to the outside of the housing according to the enlarging ratio corresponding to the enlarge event; and displaying the content enlarged in the enlarging ratio on the resized display in the second state or the third state.

The method may further include: switching to a first capture mode in a first state in which the first area is exposed and an entirety of the second area is inserted in the housing; detecting the enlarge event on the display while displaying the content on the display in the first capture mode; based on identifying that the enlarging ratio corresponding to the enlarge event is a ratio for a second capture mode among a plurality of capture modes, switching from the first capture mode to the second capture mode; switching to a second state of resizing the display by exposing a portion of the second area to the outside of the housing or a third state of resizing the display by exposing the entirety of the second area to the outside of the housing according to the enlarging ratio corresponding to the enlarge event; and displaying the content enlarged in the enlarging ratio on the resized display in the second capture mode of the second state or the second capture mode of the third state.

The method may further include: detecting the shrink event on the display while displaying the content on the display in a third state in which the first area is exposed and an entirety of the second area is exposed to the outside of the housing; switching to a second state of resizing the display by inserting a portion of the second area into the inside of the housing or a first state of resizing the display by inserting the entirety of the second area into the inside of the housing according to the shrinking ratio corresponding to the shrink event; and displaying the content shrunken in the shrinking ratio on the resized display in the second state or the first state.

The method may further include: switching to a second capture mode in a third state in which the first area is exposed and an entirety of the second area is exposed to the outside of the housing; detecting the shrink event on the display while displaying the content on the display in the second capture mode and, based on identifying that the shrinking ratio corresponding to the shrink event is a ratio for a first capture mode among a plurality of capture modes, switching from the second capture mode to the first capture mode; switching to a second state of resizing the display by inserting a portion of the second area into the inside of the housing or a first state of resizing the display by inserting the entirety of the second area into the inside of the housing according to the shrinking ratio; and displaying the content shrunken in the shrinking ratio on the resized display in the first capture mode of the second state or the first capture mode of the first state.

According to one or more embodiments, it is possible to change the current size of the display by automatically exposing or inserting the other partial area, which may be inserted or exposed from the electronic device, merely with recognition of an enlarging or shrinking event operation and provide content enlarged or shrunken in a ratio corresponding to the enlarging or shrinking event, on the resized display.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
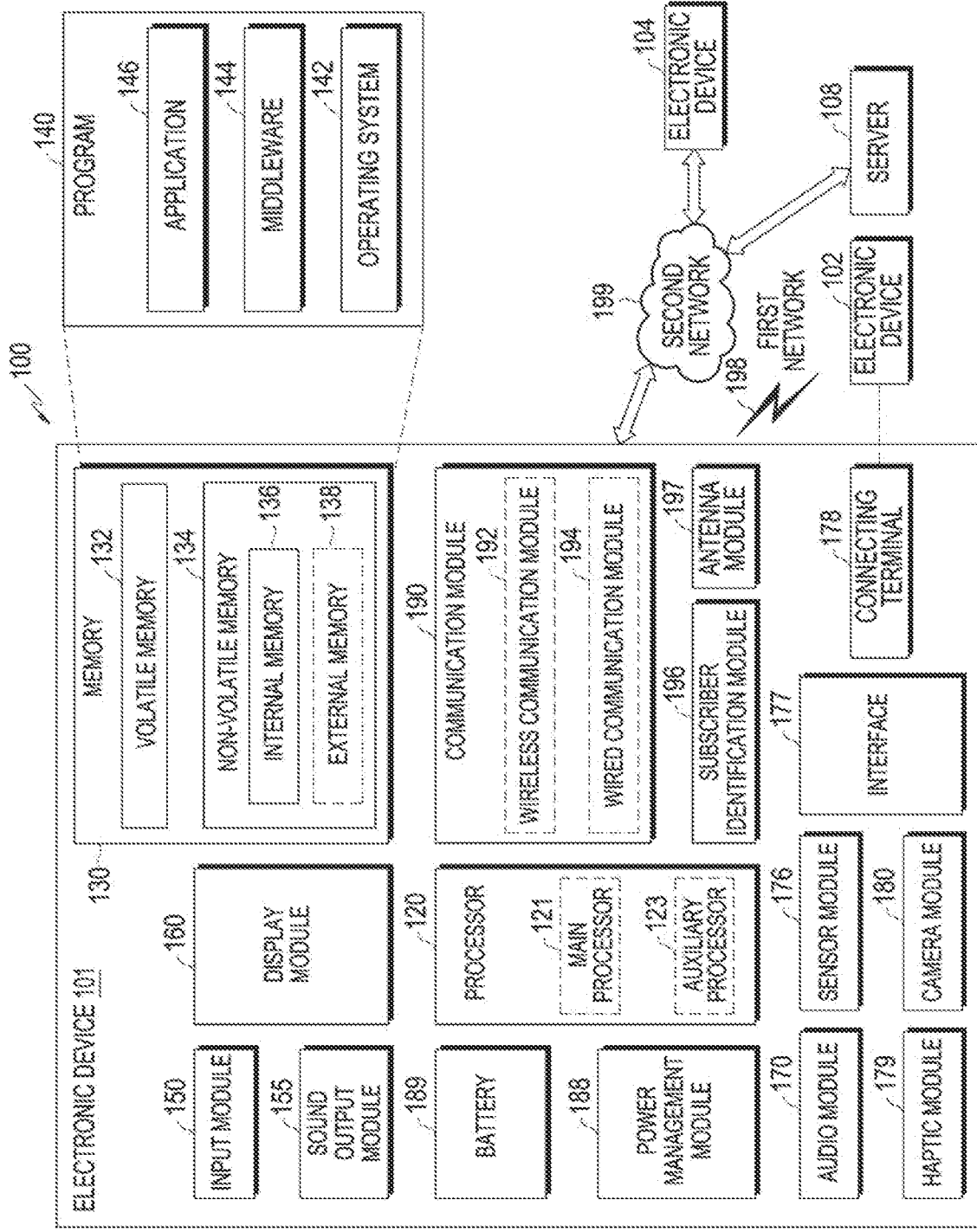
FIG. 1 is a view illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
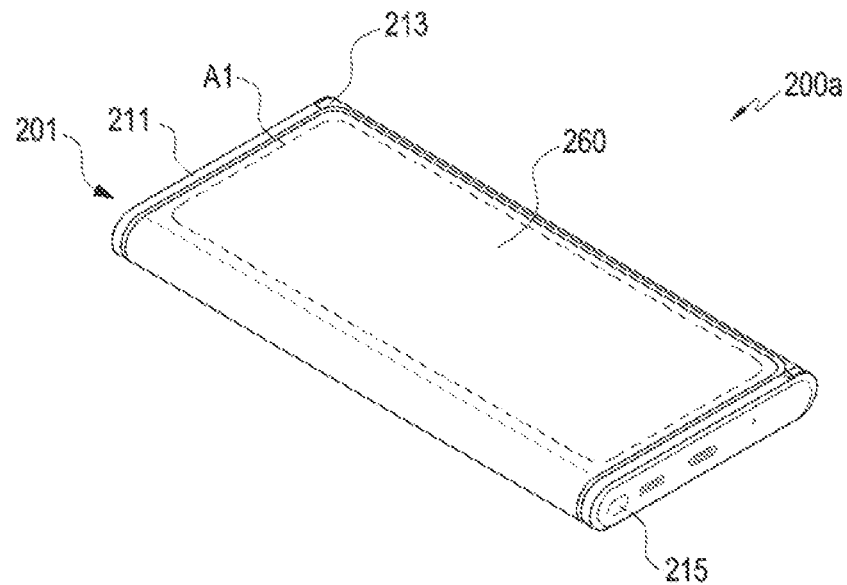
FIG. 2A is a perspective view illustrating an electronic device according to various embodiments, in which a second area of a flexible display is in a state of being inserted in a first housing.
Figure 2B:
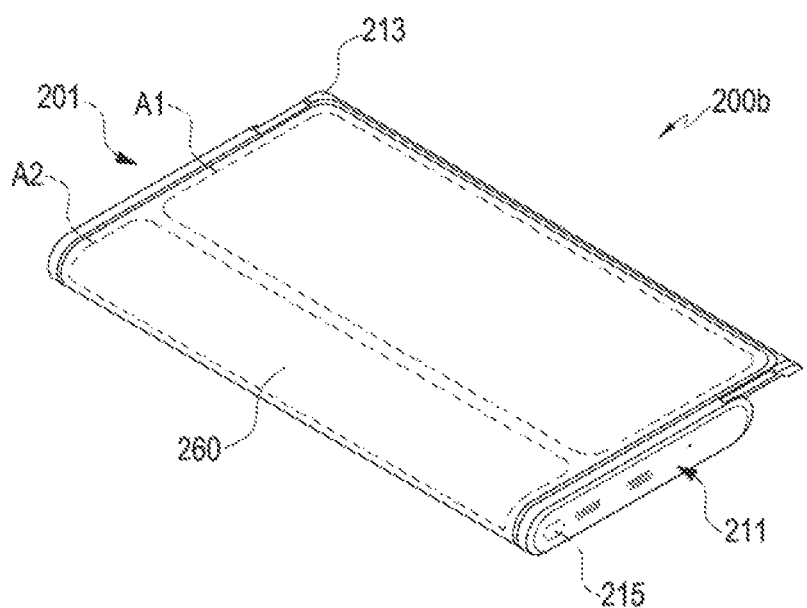
FIG. 2B is a perspective view illustrating an electronic device according to various embodiments, in which a portion of a second area of a flexible display is in a state of being exposed from a first housing.
Figure 2C:
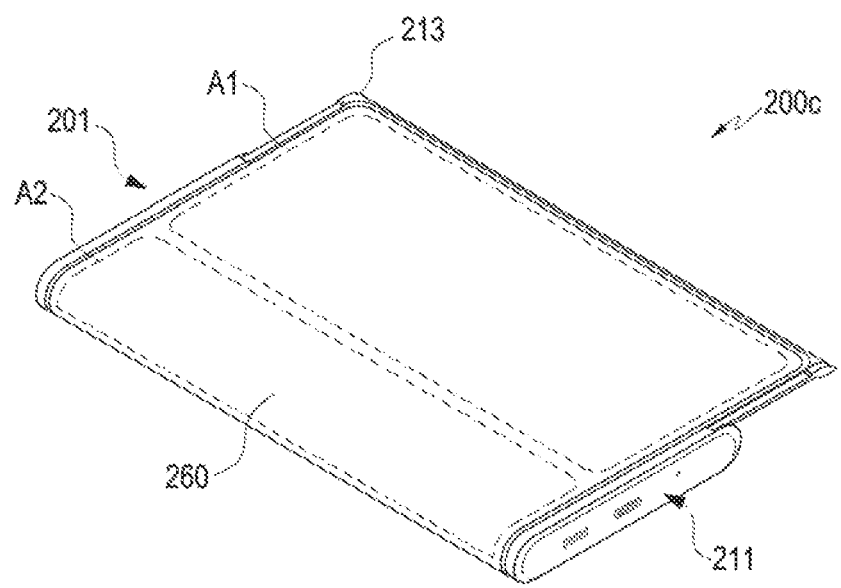
FIG. 2C is a perspective view illustrating an electronic device according to various embodiments, in which a whole second area of a flexible display is in a state of being exposed from a first housing.

FIG. 2A is a perspective view 200a illustrating an electronic device according to various embodiments, in which a second area of a flexible display is in a state of being inserted in a first housing, FIG. 2B is a perspective view 200b illustrating an electronic device according to various embodiments, in which a portion of a second area of a flexible display is in a state of being exposed from a first housing, and FIG. 2C is a perspective view 200c illustrating an electronic device according to various embodiments, in which a whole second area of a flexible display is in a state of being exposed from a first housing.

Referring to FIGS. 2A, 2B, and 2C, an electronic device 201 may include a first housing 211, a second housing 213 disposed to be movable from the first housing 211, and a roller 215 to drive the second housing 213 to be slidable from the first housing 211.

A display 260 may be disposed on the second housing 213. A first area A1 of the display 260 may be visually exposed to the outside of the first housing 211, and a second area A2 of the display 260 may be visually exposed to the outside of the first housing 211 or inserted into the inside of the first housing 211 as the second housing 213 slides.

FIG. 2A illustrates a first state in which the first area A1 of the display 260 is exposed to the outside of the first housing 211, and the second area A2 is inserted into the inside of the first housing 211.

FIG. 2B illustrates a second state in which the first area A1 is exposed to the outside of the first housing 211, and, as the second housing 213 slides, a portion of the second area A2 is exposed to the outside of the first housing 211.

FIG. 2C illustrates a third state in which the first area A1 of the display 260 is exposed to the outside of the first housing 211, and, as the second housing 213 slides, the whole second area A2 is exposed to the outside of the first housing 211.

Figure 3:
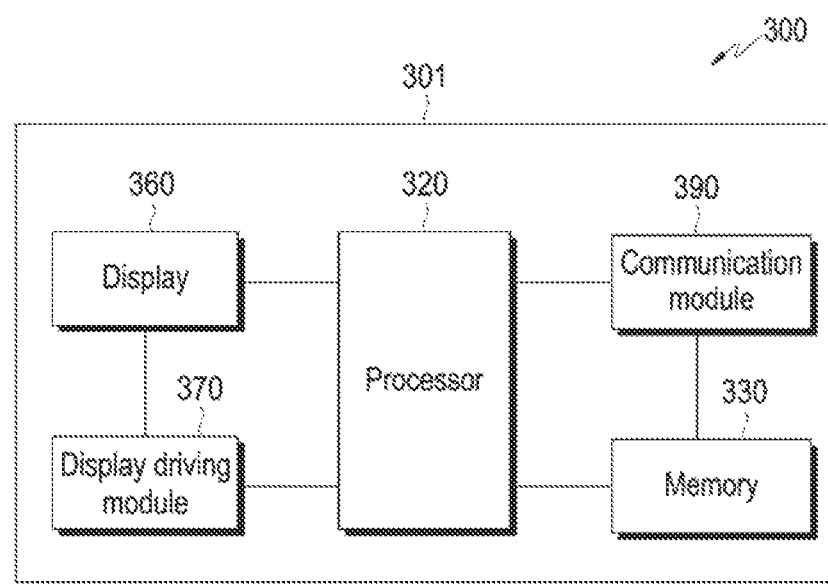
FIG. 3 is a block diagram illustrating an electronic device according to various embodiments.

FIG. 3 is a block diagram 300 illustrating an electronic device according to an embodiment.

Referring to FIG. 3, an electronic device 301 (e.g., the electronic device 101 of FIG. 1 or the electronic device 201 of FIG. 2) may include a processor 320, a memory 330, a display 360 configured to include a first area A1 and a second area A2 that may be exposed or inserted into a first housing (e.g., the first housing 211 of FIGS. 2A and 2B) of the electronic device, a display driving module 370, and a communication module 390.

According to various embodiments, the processor 320 may control the overall operation of the electronic device 301 and may be the same as the processor 120 of FIG. 1, or may perform at least one function or operation performed by the processor 120.

According to various embodiments, upon detecting an enlarge or shrink event on the display 360 while displaying content on the display 360 whose first area A1 is exposed, the processor 320 may expose or insert at least a portion of the second area A2 of the display 360 from or into the first housing (e.g., the first housing 211 of FIGS. 2A and 2B) of the electronic device according to an enlarging or shrinking ratio corresponding to the enlarge or shrink event to thereby resize the display 360 and display enlarged or shrunken content on the resized display 360.

According to an embodiment, when the enlarging or shrinking ratio corresponding to the enlarge or shrink event is a change in a predetermined ratio or more, the processor 320 may expose the second area A2 to the outside of the first housing 211 or insert the second area A2 into the inside of the first housing 211, resizing the display 360.

According to an embodiment, when the enlarging or shrinking ratio corresponding to the enlarge or shrink event is a change in the predetermined ratio or less, the processor 320 may display the content enlarged or shrunken in the enlarging or shrinking ratio on the display 360 without resizing the display 360.

According to an embodiment, the processor 320 may detect a pinch zoom in event or pinch zoom out event performed by multi-touch as the enlarge or shrink event and calculate the enlarging or shrinking ratio corresponding to the enlarge or shrink event based on the coordinates of the multi-touch. According to an embodiment, the processor 320 may provide an object (e.g., floating icon) for enlarging or shrinking the screen on the display 360, detect a touch (e.g., drag-up, drag-down, or long press) for a predetermined time as the enlarge event or shrink event, and calculate the enlarging or shrinking ratio corresponding to the enlarge or shrink event based on the drag direction or the duration of the touch. For example, upon detecting a drag-up on the object for enlarging or shrinking, the processor 320 may calculate the enlarging ratio corresponding to the enlarge event and, upon detecting a drag-down on the object, calculate the shrinking ratio corresponding to the shrink event.

According to an embodiment, upon detecting an enlarge or shrink event on the display 360, the processor 320 may calculate the enlarging or shrinking ratio corresponding to the enlarge or shrink event with respect to the current ratio of the content being displayed on the display 360, where the enlarge or shrink event is detected.

According to an embodiment, the processor 320 may control the display driving module 370 to expose the second area A2 of the display 360 to the outside of the first housing 211 or insert the second area A2 into the inside of the first housing 211 according to the enlarging or shrinking ratio corresponding to the enlarge or shrink event.

According to an embodiment, the processor 320 may detect the enlarge event on the display 360 while displaying content on the display 360 in a first state (e.g., the first state of FIG. 2A) in which the first area A1 of the display 360 is exposed, and the entire second area A2 is inserted in the first housing 211. The processor 320 may calculate the enlarging ratio corresponding to the enlarge event and control the display driving module 370 according to the enlarging ratio to switch into a second state (e.g., the second state of FIG. 2B) of resizing the display by exposing a portion of the second area A2 to the outside of the first housing 211 or a third state (e.g., the third state of FIG. 2C) of resizing the display 360 by exposing the entire second area A2 to the outside of the first housing 211. The processor 320 may display content enlarged in the enlarging ratio corresponding to the enlarge event, on the display 360 resized in the second state or third state.

According to an embodiment, the processor 320 may detect the enlarge event on the display 360 while displaying content on the display 360 in a first state (e.g., the first state of FIG. 2A) in which the first area A1 of the display 360 is exposed, and the entire second area A2 is inserted in the first housing 211, calculate the enlarging ratio corresponding to the enlarge event, and identify whether the calculated enlarging ratio exceeds a first size corresponding to the total size of the first area A1 and second area A2 of the display 360. Upon identifying that the enlarging ratio corresponding to the enlarge event exceeds the first size, the processor 320 may switch into a third state (e.g., the third state of FIG. 2C) of resizing the display 360 by exposing the entire second area A2, along with the first area A1, to the outside of the first housing 211. The processor 320 may display content enlarged in the enlarging ratio on the display 360 resized in the third state.

According to an embodiment, the first size may represent the size of the display 360 in a state in which the entire second area A2, along with the first area A1, is exposed to the outside of the first housing 211 as shown in FIG. 2C.

According to an embodiment, the processor 320 may detect an enlarge event on the display 360 while displaying content on the display 360 in a second state (e.g., the second state of FIG. 2B) in which the first area A1 of the display 360 is exposed, and a portion of the second area A2 is exposed to the outside of the first housing 211, and calculate the enlarging ratio corresponding to the enlarge event. The processor 320 may control the display driving module 370 to switch into the second state of resizing the display 360 by further exposing a portion of the second area A2 to the outside of the first housing 211 to correspond to the calculated enlarging ratio. The processor 320 may display content enlarged in the calculated enlarging ratio on the display 360 resized in the second state.

According to an embodiment, if a camera application is activated to switch into a first capture mode (e.g., a wide mode) by a default capture mode setting or user's selection in the first state (e.g., the first state of FIG. 2A) in which the first area A1 of the display 360 is exposed, and the entire second area A2 is inserted in the first housing 211, the processor 320 may display content received through the camera module (e.g., the camera module 180 of FIG. 1) on the display 360 in the first capture mode. The processor 320 may detect an enlarge event on the display 360 while displaying content on the display 360 in the first capture mode. The processor 320 may calculate the enlarging ratio corresponding to the enlarge event and, upon identifying that the calculated enlarging ratio is a ratio for a second capture mode (e.g., a telephoto capture mode) among a plurality of capture modes (e.g., wide mode and telephoto capture mode), switch from the first capture mode to the second capture mode. The processor 320 may control the display driving module 370 to switch into the second state (e.g., the second state of FIG. 2B) of resizing the display 360 by exposing a portion of the second area A2 to the outside of the first housing 211 to correspond to the calculated enlarging ratio or the third state (e.g., the third state of FIG. 2C) of resizing the display 360 by exposing the entire second area A2 to the outside of the first housing 211. The processor 320 may display the content enlarged in the calculated enlarging ratio on the resized display 360 in the second capture mode (e.g., telephoto capture mode) of the second state (e.g., the second state of FIG. 2B) or the second capture mode (e.g., telephoto capture mode) of the third state (e.g., the third state of FIG. 2C).

According to an embodiment, in the first state (e.g., the first state of FIG. 2A) in which the first area A1 of the display 360 is exposed, and the entire second area A2 is inserted in the first housing 211, the processor 320 may activate the camera application, switch into the first capture mode (e.g., wide mode) by the default capture mode setting or user's selection, detect an enlarge event on the display 360 while displaying content on the display 360 in the first capture mode, calculate the enlarging ratio corresponding to the enlarge event, and upon identifying that the calculated enlarging ratio is a ratio of the second capture mode (e.g., telephoto capture mode) among the plurality of capture modes (e.g., wide mode and telephoto capture mode), switch the first capture mode into the second capture mode. The processor 320 may identify whether the calculated enlarging ratio exceeds a first size corresponding to the total size of the first area A1 and second area A2 of the display 360. Upon identifying that the calculated enlarging ratio exceeds the first size, the processor 320 may switch into the third state (e.g., the third state of FIG. 2C) of resizing the display 360 by exposing the entire second area A2 to the outside of the first housing 211 and display the content enlarged in the calculated enlarging ratio on the display 360 resized in the second capture mode (e.g., telephoto capture mode) of the third state.

According to an embodiment, the processor 320 may detect a shrink event on the display 360 while displaying content on the display 360 in the third state (e.g., the second state of FIG. 2C) in which the first area A1 of the display 360 is exposed, and the entire second area A2 is exposed to the outside of the first housing 211, and calculate the shrinking ratio corresponding to the shrink event. The processor 320 may control the display driving module 370 to switch into the second state (e.g., the second state of FIG. 2B) of resizing the display 360 by inserting a portion of the second area A2 into the inside of the first housing 211 to correspond to the shrinking ratio or the first state (e.g., the first state of FIG. 2A) of resizing the display 360 by inserting the entire second area A2 into the inside of the first housing 211. The processor 320 may display the content shrunken in the calculated shrinking ratio on the display 360 resized in the second state or the first state.

According to an embodiment, the processor 320 may detect a shrink event on the display 360 while displaying content on the display 360 in the third state (e.g., the third state of FIG. 2C) in which the first area A1 of the display 360 is exposed, and the entire second area A2 is exposed to the outside of the first housing 211, calculate the shrinking ratio corresponding to the shrink event, and identify whether the calculated shrinking ratio is less than a second size corresponding to the size of the entire first area A1 of the display 360. Upon identifying that the calculated shrinking ratio is less than the second size, the processor 320 may control the display driving module 370 to switch into the first state (e.g., the first state of FIG. 2A) of resizing the display 360 by inserting the entire second area A2 into the first housing 211 and display the content shrunken in the calculated shrinking ratio on the display 360 resized in the first state.

According to an embodiment, the second size may represent the size of the display 360 in a state in which the first area A1 is exposed, and the entire second area A2 is inserted in the first housing 211 as shown in FIG. 2A.

According to an embodiment, the processor 320 may detect a shrink event on the display 360 while displaying content on the display 360 in a second state (e.g., the second state of FIG. 2B) in which the first area A1 of the display 360 is exposed, and a portion of the second area A2 is exposed to the outside of the first housing 211, and calculate the shrinking ratio corresponding to the shrink event. The processor 320 may control the display driving module 370 to switch into the changed second state of resizing the display 360 by further inserting a portion of the second area A2 to the inside of the first housing 211 to correspond to the calculated shrinking ratio. The processor 320 may display content shrunken in the calculated shrinking ratio on the display 360 resized in the second state.

According to an embodiment, the processor 320 may activate the camera application in the third state (e.g., the third state of FIG. 2C) in which the first area A1 of the display 360 is exposed, and the entire second area A2 is exposed to the outside of the first housing 211 and switch into the second capture mode (e.g., telephoto capture mode) by the default capture mode setting or user's selection. The processor 320 may detect a shrink event on the display 360 while displaying the content received through the camera module (e.g., the camera module 180 of FIG. 1) in the second capture mode, on the display 360. Upon identifying that the shrinking ratio corresponding to the shrink event is a ratio for the first capture mode (e.g., wide capture mode) among the plurality of capture mode (e.g., wide capture mode and telephoto capture mode), the processor 320 may switch from the second capture mode to the first capture mode. The processor 320 may control the display driving module 370 to switch into the second state of resizing the display 360 by inserting a portion of the second area A2 into the inside of the first housing 211 to correspond to the calculated shrinking ratio or the first state (e.g., the first state of FIG. 2A) of resizing the display by inserting the entire second area A2 into the first housing 211. The processor 320 may display the content shrunken in the shrinking ratio on the display 360 resized in the first capture mode (e.g., wide mode) of the second state or the first capture mode (e.g., wide mode) of the first state.

According to an embodiment, the processor 320 may activate the camera application in the third state (e.g., the third state of FIG. 2C) in which the first area A1 of the display 360 is exposed, and the entire second area A2 is exposed to the outside of the first housing 211, switch into the second capture mode (e.g., telephoto capture mode) by the default capture mode setting or user's selection, and detect a shrink event on the display 360 while displaying content on the display 360 in the second camera mode. The processor 320 may calculate the shrinking ratio corresponding to the shrink event and, upon identifying that the calculated shrinking ratio is a ratio for the first capture mode among the plurality of camera modes (e.g., wide capture mode and telephoto capture mode), switch from the second capture mode to the first capture mode. The processor 320 may identify whether the calculated shrinking ratio is less than the second size corresponding to the size of the entire first area A1 of the display. Upon identifying that the calculated shrinking ratio is less than the second size, the processor 320 may switch into the first state (e.g., the first state of FIG. 2A) of resizing the display by inserting the entire second area A2 of the display 360 into the inside of the first housing 211 and display the content shrunken in the shrinking ratio on the display 360 resized in the first capture mode (e.g., wide mode) of the first state.

According to various embodiments, upon detecting an enlarge or shrink event on the display 360 while displaying content on the display 360, the processor 320 may enlarge or shrink the content to correspond to the enlarging or shrinking ratio corresponding to the enlarge or shrink event. The processor 320 may resize the display 360 according to exposure to the outside of, or insertion into the inside of, the first housing (e.g., the first housing 211 of FIGS. 2A and 2B), of the second area A2 to correspond to the enlarging or shrinking ratio and display the enlarged or shrunken content on the resized display 360.

According to various embodiments, at the time when the second area A2 of the display 360 moves according to detection of an enlarge or shrink event while displaying content on the display 360, the processor 320 may correct two coordinate values corresponding to the multi-touch for the enlarge or shrink event, minimizing an error in the enlarging or shrinking ratio corresponding to the enlarge or shrink event.

For example, in a case where enlarging is performed by spreading two fingers corresponding to the multi-touch with the fingers touching the display 360, the second area A2 of the display 360 may be exposed to the outside of the first housing 211 of the electronic device. At this time, if the two fingers touching the display 360 are pushed along with the display 360, the enlarging ratio may be changed according to a change in the coordinates corresponding to the multi-touch. Thus, the processor 320 may identify a change in the coordinates corresponding to the multi-touch within a threshold at the time when the second area A2 of the display 360 is moved, as a minor ratio change, and refrain from applying the ratio change.

According to various embodiments, upon detecting an enlarge or shrink event while displaying content on the display 360, the processor 320 may move the second area A2 of the display 360 to correspond to the enlarging or shrinking ratio corresponding to the enlarge or shrink event at the time when the multi-touch for the enlarge or shrink event is terminated.

For example, in a case where enlarging is performed by spreading two fingers corresponding to the multi-touch, with the fingers touching the display 360, the second area A2 of the display 360 may be exposed to the outside of the first housing 211 of the electronic device. At this time, if the two fingers touching the display 360 is pushed along with the display 360, the enlarging ratio may be changed according to a change in the coordinates corresponding to the multi-touch. Thus, the processor 320 may move the second area A2 of the display 360 at the time when the two fingers corresponding to the multi-touch are taken off not to contact the display 360.

According to various embodiments, upon detecting an enlarge or shrink event while displaying content on the display 360, the processor 320 may move the second area A2 of the display 360 according to the enlarging or shrinking ratio corresponding to the enlarge or shrink event to resize the display and change the layout of the content to correspond to the enlarging or shrinking ratio on the resized display. For example, upon detecting an enlarge or shrink event while displaying a web browser or YouTube on the display 360, the processor 320 may move the second area A2 of the display 360 according to the enlarging or shrinking ratio corresponding to the enlarge or shrink event to resize the display 360 and change the layout of the web browser or YouTube to correspond to the enlarging or shrinking ratio on the resized display 360, providing an enlarged or shrunken web browser or YouTube.

According to various embodiments, upon detecting an enlarge or shrink event while displaying content on the display 360, the processor 320 may move the second area A2 of the display 360 according to the enlarging or shrinking ratio corresponding to the enlarge or shrink event to resize the display and change the font size of the content to correspond to the enlarging or shrinking ratio on the resized display. For example, upon detecting an enlarge or shrink event while displaying a text message on the display 360, the processor 320 may move the second area A2 of the display 360 according to the enlarging or shrinking ratio corresponding to the enlarge or shrink event to resize the display and change only the size of the text, indicating the content of the text message, to correspond to the enlarging or shrinking ratio and display it.

According to various embodiments, when the electronic device 301 includes two second housings which are slidable to two opposite sides, upon detecting an enlarge or shrink event, the processor 320 may resize the display by sliding the two second housings one by one according to priority or resize the display by simultaneously sliding the two second housings to the two opposite sides.

According to various embodiments, the memory 330 may be implemented to be substantially the same or similar to the memory 130 of FIG. 1.

According to various embodiments, the display 360 may be implemented in substantially the same or similar manner to the display module 160 of FIG. 1.

According to an embodiment, the display 360 may include the first area A1 and the second area A2 and display various contents as shown in FIGS. 2A, 2B, and 2C.

According to an embodiment, the first area A1 of the display 360 is exposed from the first housing (e.g., the first housing 211 of FIGS. 2A and 2B) of the electronic device.

According to an embodiment, the second area A2 of the display 360 may be exposed to the outside of the first housing 211 or inserted into the inside of the first housing 211 according to the enlarging or shrinking ratio corresponding to the enlarge or shrink event detected on the display 360.

According to various embodiments, the display driving module 370 may expose the second area A2 of the display 360 to the outside of the first housing (e.g., the first housing 211 of FIGS. 2A and 2B) of the electronic device or insert into the inside of the first housing 211.

According to an embodiment, the display driving module 370 may denote the rollable roller 215 of FIGS. 2A, 2B, and 2C and may include the motor.

According to an embodiment, in a case where the electronic device 301 includes two second housings slidable to two opposite sides, the display driving module 370 may include a plurality of rollers for driving the two third housing to be slidable to the two opposite sides, respectively.

According to an embodiment, the communication module 390 may be implemented to be substantially identical or similar to the communication module 190 of FIG. 1 and may include a plurality of communication circuits using different communication technologies, including the communication module 390.

According to an embodiment, the communication module 390 may include at least one of a wireless LAN module and a short-range communication module and may include a UWB communication module, Wi-Fi communication module, NFC communication module, Bluetooth legacy communication module, and/or a BLE communication module as the short-range communication module.

According to various embodiments, an electronic device (e.g., any of the electronic device 101 of FIG. 1, the electronic device 201 of FIGS. 2A, 2B, and 2C, and the electronic device 301 of FIG. 3) may comprise a flexible display (e.g., the display 260 of FIGS. 2A, 2B, and 2C and the display 360 of FIG. 3) configured to include a first area A1 and a second area A2 extending from the first area A1, the second area A2 being inserted into an inside of a first housing (e.g., the first housing 211 of FIGS. 2A, 2B, and 2C) of the electronic device or exposed to an outside of the first housing 211 and a processor (e.g., the processor 120 of FIG. 1 or the processor 320 of FIG. 3) configured to, upon detecting an enlarge or shrink event on the display while displaying content on the display in a state in which the first area A1 is exposed, and the second area A2 is inserted or exposed in/from the first housing 211, resize the display by exposing or inserting the second area A2 according to an enlarging or shrinking ratio corresponding to the enlarge or shrink event and display content enlarged or shrunken in the enlarging or shrinking ratio on the resized display.

According to various embodiments, the processor may be configured to, when the enlarging or shrinking ratio is a change in a predetermined ratio or more, resize the display by exposing the second area A2 to the outside of the first housing 211 or inserting the second area A2 into the inside of the first housing 211.

According to various embodiments, the processor may be configured to, upon detecting an enlarge event on the display while displaying the content on the display in a first state in which the first area A1 is exposed, and the entire second area A2 is inserted in the first housing 211, switch into a second state of resizing the display by exposing a portion of the second area A2 to the outside of the first housing 211 or a third state of resizing the display by exposing the entire second area A2 to the outside of the first housing 211 according to an enlarging ratio corresponding to the enlarge event, and display the content enlarged in the enlarging ratio on the resized display in the second state or the third state.

According to various embodiments, the processor may be configured to detect an enlarge event on the display while displaying the content on the display in a first state in which the first area A1 is exposed, and the entire second area A2 is inserted in the first housing 211 and, if an enlarging ratio corresponding to the enlarge event exceeds a first size corresponding to a total size of the first area A1 and the second area of the display, switch into a third state of resizing the display by exposing the entire second area A2 to the outside of the first housing 211 and display the content enlarged in the enlarging ratio on the resized display in the third state.

According to various embodiments, the processor may be configured to switch into a first capture mode in a first state in which the first area A1 is exposed, and the entire second area A2 is inserted in the first housing 211, detect an enlarge event on the display while displaying the content on the display in the first capture mode and, upon identifying that an enlarging ratio corresponding to the enlarge event is a ratio for a second capture mode among a plurality of capture modes, switch from the first capture mode to the second capture mode, and upon switching into a second state of resizing the display by exposing a portion of the second area A2 to the outside of the first housing 211 or a third state of resizing the display by exposing the entire second area A2 to the outside of the first housing 211 according to the enlarging ratio corresponding to the enlarge event, display the content enlarged in the enlarging ratio on the resized display in the second capture mode of the second state or the second capture mode of the third state.

According to various embodiments, the processor may be configured to switch into a first capture mode in a first state in which the first area A1 is exposed, and the entire second area A2 is inserted in the first housing 211, detect an enlarge event on the display while displaying the content on the display in the first capture mode and, upon identifying that an enlarging ratio corresponding to the enlarge event is a ratio for a second capture mode among a plurality of capture modes, switch from the first capture mode to the second capture mode, and if the enlarging ratio exceeds a first size corresponding to a total size of the first area A1 and the second area A2 of the display, switch into a third state of resizing the display by exposing the entire second area A2 to the outside of the first housing 211 and display the content enlarged in the enlarging ratio on the resized display in the second capture mode of the third state.

According to various embodiments, the processor may be configured to, upon detecting a shrink event on the display while displaying the content on the display in a third state in which the first area A1 is exposed, and the entire second area A2 is exposed to the outside of the first housing 211, switch into a second state of resizing the display by inserting a portion of the second area A2 into the inside of the first housing 211 or a first state of resizing the display by inserting the entire second area A2 into the inside of the first housing 211 according to a shrinking ratio corresponding to the shrink event, and display the content shrunken in the shrinking ratio on the resized display in the second state or the first state.

According to various embodiments, the processor may be configured to detect a shrink event on the display while displaying the content on the display in a third state in which the first area A1 is exposed, and the entire second area A2 is exposed to the outside of the first housing 211 and, if a shrinking ratio corresponding to the shrink event is less than a second size corresponding to a size of the entire first area A1 of the display, switch into a first state of resizing the display by inserting the entire second area A2 into the inside of the first housing 211, and display the content shrunken in the shrinking ratio on the resized display in the first state.

According to various embodiments, the processor may be configured to switch into a second capture mode in a third state in which the first area A1 is exposed, and the entire second area A2 is exposed to the outside of the first housing 211, detect a shrink event on the display while displaying the content on the display in the second capture mode, upon identifying that a shrinking ratio corresponding to the shrink event is a ratio for a first capture mode among a plurality of capture modes, switch into the first capture mode in the second capture mode, and if switching into a second state of resizing the display by inserting a portion of the second area A2 into the inside of the first housing 211 or a first state of resizing the display by inserting the entire second area into the inside of the first housing 211 according to the shrinking ratio, display the content shrunken in the shrinking ratio on the resized display in the first capture mode of the second state A2 or the first capture mode of the first state A1.

According to various embodiments, the processor may be configured to switch into a second capture mode in a third state in which the first area A1 is exposed, and the entire second area A2 is exposed to the outside of the first housing 211, detect a shrink event on the display while displaying the content on the display in the second capture mode and, upon identifying that a shrinking ratio corresponding to the shrink event is a ratio for a first capture mode among a plurality of capture modes, switch from the second capture mode to the first capture mode, and if the shrinking ratio is less than a second size corresponding to a size of the entire first area A1 of the display, switch into a first state of resizing the display by inserting the entire second area A2 into the inside of the first housing 211 and display the content shrunken in the shrinking ratio on the resized display in the first capture mode of the first state.

Figure 4:
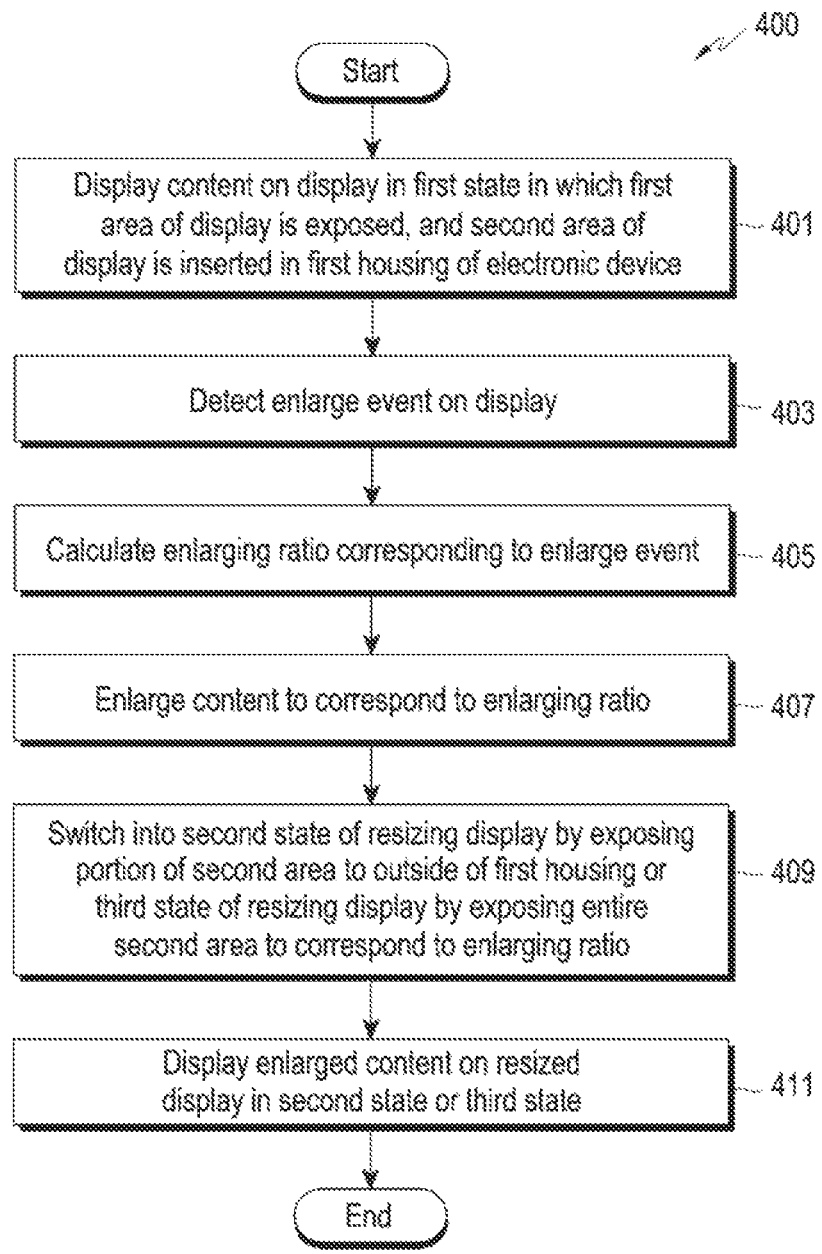
FIG. 4 is a flowchart illustrating an operation of displaying enlarged content in an electronic device according to various embodiments.

FIG. 4 is a flowchart 400 illustrating an operation of displaying enlarged content in an electronic device according to various embodiments. The operation of displaying content may include operations 401, 403, 405, 407, 409, and 411. According to an embodiment, at least one of operations 401, 403, 405, 407, 409, and 411 may be omitted or changed in order or may add other operations.

In operation 401, the electronic device (e.g., any of the electronic device 101 of FIG. 3) may display content on the display 360 in the first state in which the first area A1 of the display (e.g., the display 360 of FIG. 3) is exposed, and the second area A2 of the display is inserted in the first housing (e.g., the first housing 211 of FIGS. 2A, 2B, and 2C).

According to an embodiment, the electronic device may display the content in the first area A1 in the first state in which the entire first area A1 of the display is exposed to the outside of the first housing 211, and the entire second area A2 of the display is inserted into the inside of the first housing 211.

In operation 403, the electronic device (e.g., any of the electronic device 101 of FIG. 1, the electronic device 201 of FIGS. 2A, 2B, and 2C, and the electronic device 301 of FIG. 3) may detect an enlarge event on the display (e.g., the display 360 of FIG. 3).

According to an embodiment, the electronic device may detect the enlarge event in the first area A1 while displaying content in the first area A1 of the display.

According to an embodiment, the electronic device may detect a pinch zoom in action, performed as multi-touch on the display, as the enlarge event.

According to an embodiment, the electronic device may provide an object (e.g., floating icon) for detecting an enlarge or shrink event on the display and detect a user input (e.g., drag-up) on the object as the enlarge event.

In operation 405, the electronic device (e.g., any of the electronic device 101 of FIG. 1, the electronic device 201 of FIGS. 2A, 2B, and 2C, and the electronic device 301 of FIG. 3) may calculate the enlarging ratio corresponding to the enlarge event.

According to an embodiment, the electronic device may calculate the enlarging ratio corresponding to the enlarge event with respect to the current ratio of the content being displayed in the first area A1 of the display where the enlarge event is detected.

According to an embodiment, the electronic device may calculate the enlarging ratio based on a change in the coordinates of the multi-touch for performing the enlarge event. According to an embodiment, the electronic device may calculate the enlarging ratio corresponding to the enlarge event and previously display the content enlarged to correspond to the calculated enlarging ratio as a UI to allow the user to intuitively preview her desired enlarge event. The electronic device may enlarge and display only content to correspond to the calculated enlarging ratio without resizing the display through the UI or may resize the display and enlarge and display the content to correspond to the calculated enlarging ratio.

In operation 407, the electronic device (e.g., any of the electronic device 101 of FIG. 1, the electronic device 201 of FIGS. 2A, 2B, and 2C, and the electronic device 301 of FIG. 3) may enlarge the content to correspond to the enlarging ratio.

In operation 409, the electronic device (e.g., any of the electronic device 101 of FIG. 1, the electronic device 201 of FIGS. 2A, 2B, and 2C, and the electronic device 301 of FIG. 3) may switch into the second state of resizing the display (e.g., the display 360 of FIG. 3) by exposing a portion of the second area A2 to the outside of the first housing (e.g., the first housing 211 of FIGS. 2A, 2B, and 2C) of the electronic device to correspond to the enlarging ratio or the third state of resizing the display by exposing the entire second area A2.

According to an embodiment, when the enlarging ratio corresponding to the enlarge event is a change in a predetermined ratio or more, the electronic device may expose the second area A2 to the outside of the first housing 211 to thereby switch into the second state or the third state.

According to an embodiment, the electronic device may switch from the state in which the entire first area A1 of the display is exposed to the outside of the first housing 211 into the second state in which a portion of the second area A2 of the display is exposed to the outside of the first housing 211 or the third state in which the entire second area A2 of the display is exposed to the outside of the first housing 211.

In operation 411, the electronic device (e.g., any of the electronic device 101 of FIG. 1, the electronic device 201 of FIGS. 2A, 2B, and 2C, and the electronic device 301 of FIG. 3) may display enlarged content on the display (e.g., the display 360 of FIG. 3) resized in the second state (e.g., the second state of FIG. 2B) or the third state (e.g., the third state of FIG. 2C).

According to an embodiment, the electronic device may display the enlarged content on the display resized in the second state in which the entire first area A1 of the display and a portion of the second area A2 to correspond to the enlarging ratio is exposed.

According to an embodiment, the electronic device may display the enlarged content on the display resized in the third state in which the entire first area A1 of the display and the entire second area A2 to correspond to the enlarging ratio are exposed.

Figure 5A:
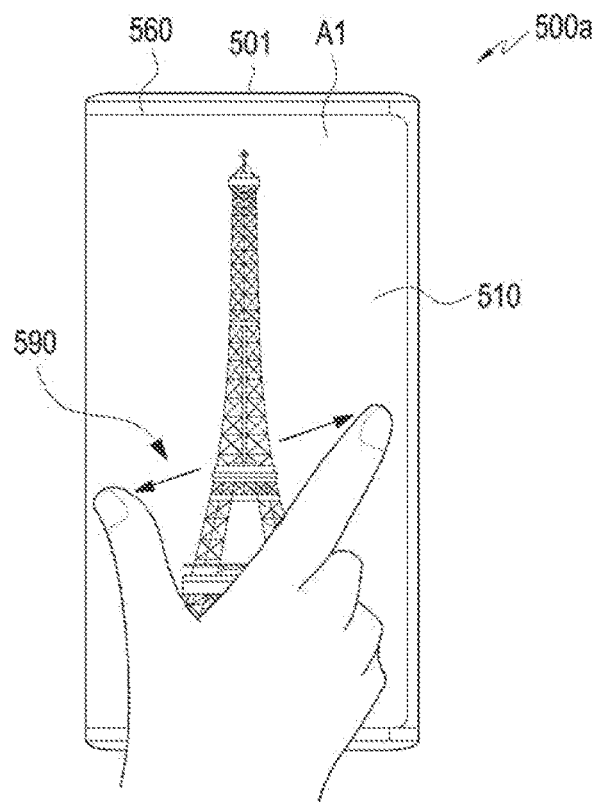
FIGS. 5A and 5B are views illustrating an operation of displaying enlarged content in an electronic device according to various embodiments.
Figure 5B:
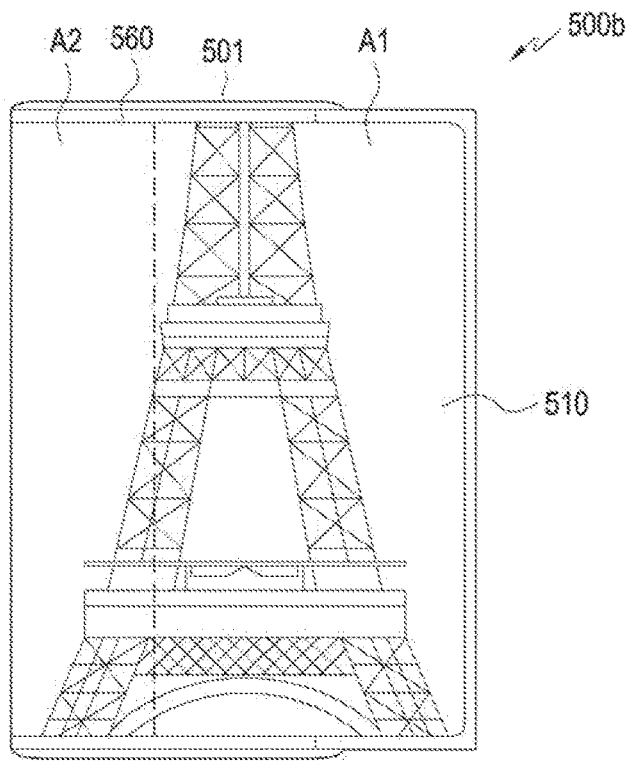

FIGS. 5A and 5B are views 500a and 500b illustrating an operation of displaying enlarged content in an electronic device according to various embodiments.

As shown in FIG. 5A, an electronic device 501 (e.g., any of the electronic device 101 of FIG. 1, the electronic device 201 of FIGS. 2A, 2B, and 2C, and the electronic device 301 of FIG. 3) may detect an enlarge event 590 in a first area A1 of a display 560 while displaying content 510 in the first area A1 of the display 560 in a first state (e.g., the first state of FIG. 2A) in which the first area A1 of the display 560 (e.g., the display 360 of FIG. 3) is exposed, and the entire second area A2 of the display 560 is inserted in the first housing (e.g., the first housing 211 of FIGS. 2A, 2B, and 2C). The electronic device may calculate the enlarging ratio corresponding to the enlarge event with respect to the current ratio of the content 510 being displayed in the first area A1 of the display 560 where the enlarge event 590 is detected.

As shown in FIG. 5B, the electronic device may resize the display 560 by exposing a portion of the second area A2 to the outside of the first housing 211 to correspond to the calculated enlarging ratio and display the content 510 enlarged to correspond to the enlarging ratio on the resized display 560.

FIGS. 6A, 6B, 6C, and 6D are views 600a, 600b, 600c, and 600d illustrating an operation of displaying enlarged content in an electronic device according to various embodiments.

Figure 6A:
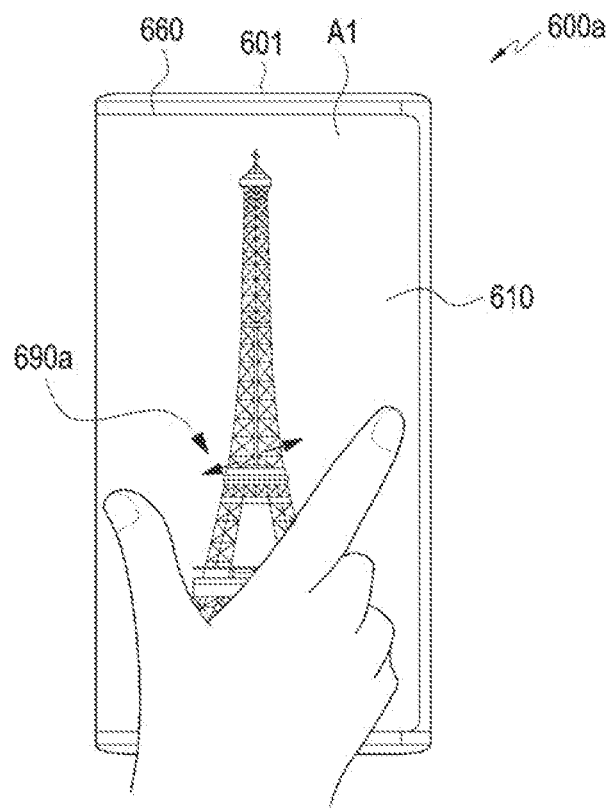
FIGS. 6A, 6B, 6C, and 6D are views illustrating an operation of displaying enlarged content in an electronic device according to various embodiments.
Figure 6B:
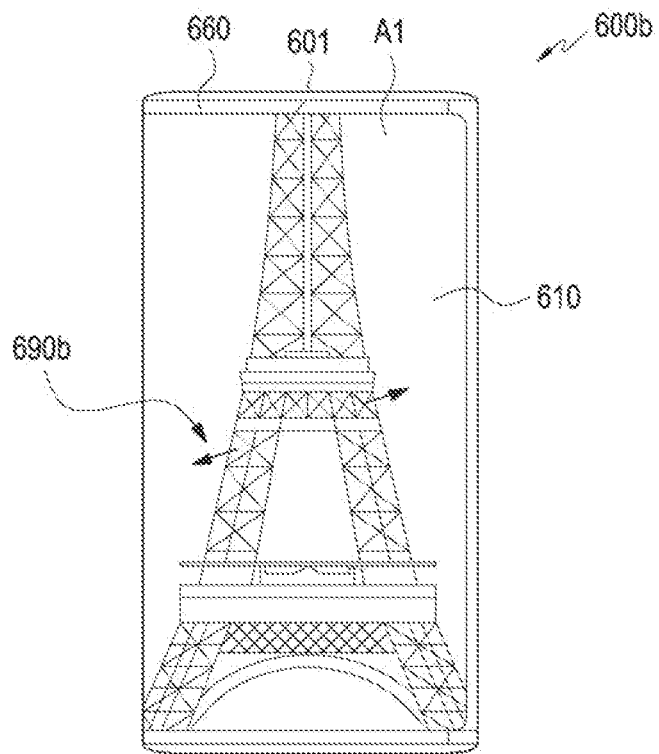

As shown in FIG. 6A, an electronic device 601 (e.g., any of the electronic device 101 of FIG. 1, the electronic device 201 of FIGS. 2A, 2B, and 2C, and the electronic device 301 of FIG. 3) may detect an enlarge event 690a in the first area A1 of the display 660 while displaying content 610 in the first area A1 of the display 660 in a first state (e.g., the first state of FIG. 2A) in which the first area A1 of the display 660 (e.g., the display 360 of FIG. 3) is exposed, and the entire second area A2 of the display 660 is inserted in the first housing (e.g., the first housing 211 of FIGS. 2A, 2B, and 2C) of the electronic device 601. The electronic device may calculate the enlarging ratio corresponding to the enlarge event with respect to the current ratio of the content 610 being displayed in the first area A1 of the display 660 where the enlarge event 690a is detected. Upon identifying that the enlarging ratio is a change in a predetermined ratio or less, the electronic device may display the content enlarged to correspond to the enlarging ratio in the first area A1 of the display 660 without resizing the display 660 as shown in FIG. 6B. As shown in FIG. 6B, upon detecting an enlarge event 690b on the display 660 while displaying the content enlarged to correspond to the enlarging ratio in the first area A1 of the display 660, the electronic device 601 may calculate the enlarging ratio corresponding to the enlarge event with respect to the current ratio of the content being displayed on the display 660 where the enlarge event 690b is detected. Upon identifying that the enlarging ratio is the change in the predetermined ratio or more, the electronic device 601 may display the content enlarged to correspond to the enlarging ratio on the display 660 resized in the second state (e.g., the second state of FIG. 2B) of resizing the display 660 by exposing a portion of the second area A2 corresponding to the enlarging ratio to the outside of the first housing as shown in FIG. 6C.

Figure 6C:
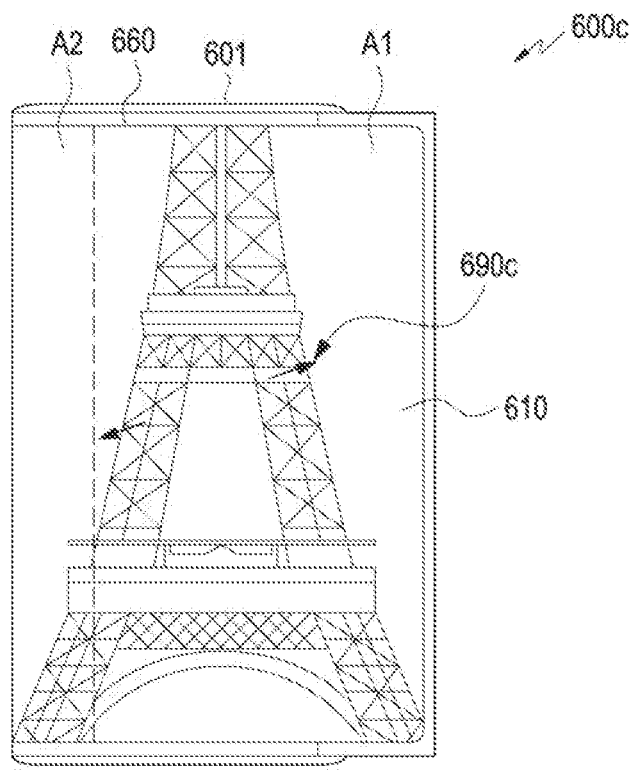
Figure 6D:
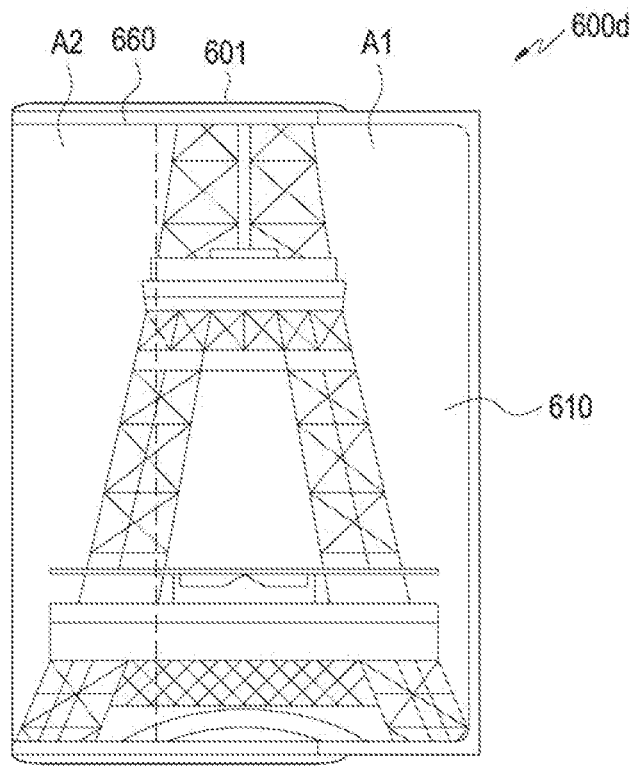

As shown in FIG. 6C, upon detecting an enlarge event 690c on the display 660 while displaying the content enlarged to correspond to the enlarging ratio in the first area A1 and a portion of the second area A2 of the display 660, the electronic device 601 may calculate the enlarging ratio corresponding to the enlarge event with respect to the current ratio of the content being displayed on the display 660 where the enlarge event 690c is detected. Upon identifying that the enlarging ratio is the change in the predetermined ratio or more, the electronic device 601 may display the content enlarged to correspond to the enlarging ratio on the resized display 660 in the second state of resizing the display 660 by further exposing a portion of the second area A2 corresponding to the enlarging ratio to the outside of the first housing as shown in FIG. 6D.

Figure 7:
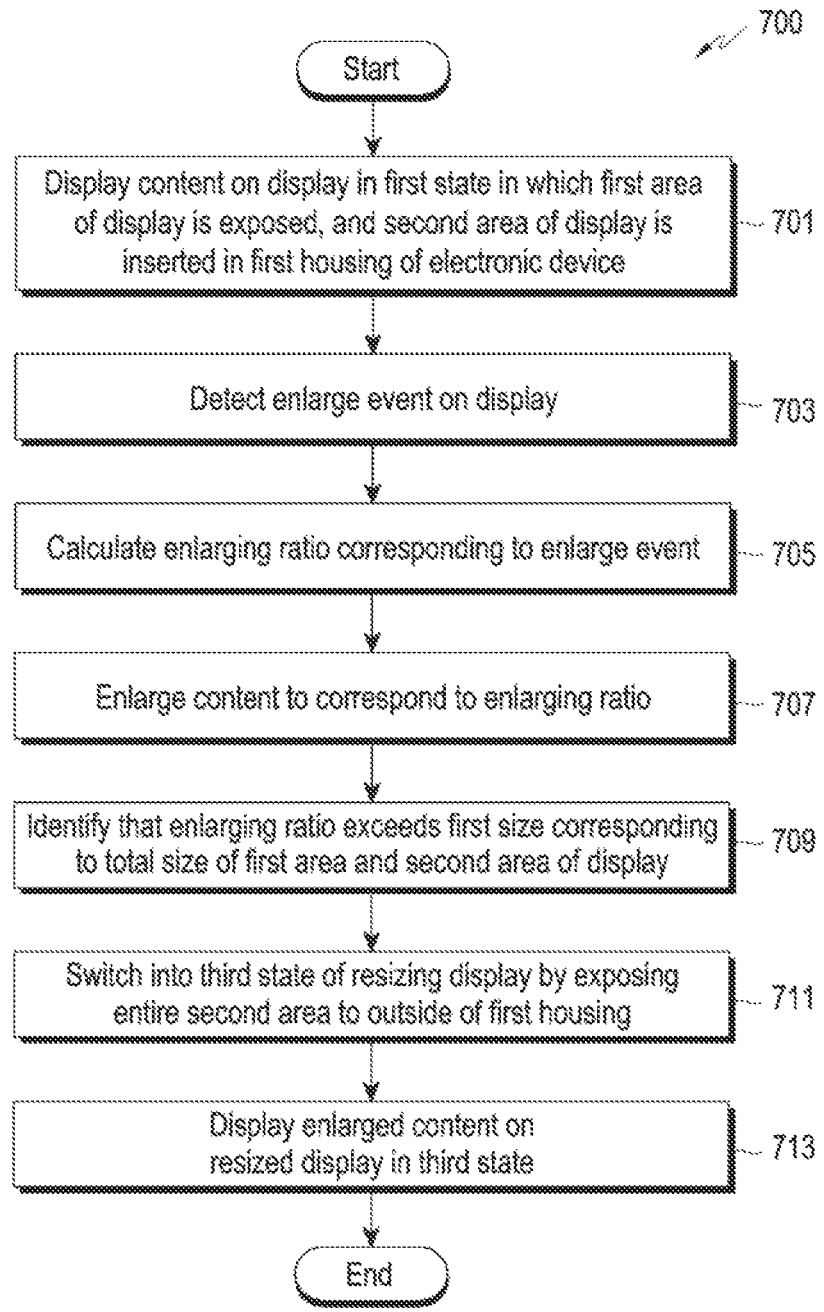
FIG. 7 is a flowchart illustrating an operation of displaying enlarged content in an electronic device according to various embodiments.

FIG. 7 is a flowchart 700 illustrating an operation of displaying enlarged content in an electronic device according to various embodiments. The operation of displaying content may include operations 701, 703, 705, 707, 709, 711, and 713. According to an embodiment, at least one of operations 701, 703, 705, 707, 709, 711, and 713 may be omitted or changed in order or may add other operations.

In operation 701, the electronic device (e.g., any of the electronic device 101 of FIG. 1, the electronic device 201 of FIGS. 2A, 2B, and 2C, and the electronic device 301 of FIG. 3) may display content on the display in the first state in which the first area A1 of the display (e.g., the display 360 of FIG. 3) is exposed, and the second area A2 of the display is inserted in the first housing (e.g., the first housing 211 of FIGS. 2A, 2B, and 2C).

According to an embodiment, the electronic device may display the content in the first area A1 in the first state in which the entire first area A1 of the display is exposed to the outside of the first housing 211, and the entire second area A2 of the display is inserted into the inside of the first housing 211.

In operation 703, the electronic device (e.g., any of the electronic device 101 of FIG. 1, the electronic device 201 of FIGS. 2A, 2B, and 2C, and the electronic device 301 of FIG. 3) may detect an enlarge event on the display (e.g., the display 360 of FIG. 3).

According to an embodiment, the electronic device may detect the enlarge event in the first area A1 while displaying content in the first area A1 of the display.

According to an embodiment, the electronic device may detect a pinch zoom in action, performed as multi-touch on the display, as the enlarge event.

According to an embodiment, the electronic device may provide an object (e.g., floating icon) for detecting an enlarge or shrink event on the display and detect a user input (e.g., drag-up) on the object as the enlarge event.

In operation 705, the electronic device (e.g., any of the electronic device 101 of FIG. 1, the electronic device 201 of FIGS. 2A, 2B, and 2C, and the electronic device 301 of FIG. 3) may calculate the enlarging ratio corresponding to the enlarge event.

According to an embodiment, the electronic device may calculate the enlarging ratio corresponding to the enlarge event with respect to the current ratio of the content being displayed in the first area A1 of the display where the enlarge event is detected.

According to an embodiment, the electronic device may calculate the enlarging ratio based on a change in the coordinates of the multi-touch for performing the enlarge event.

According to an embodiment, the electronic device may calculate the enlarging ratio corresponding to the enlarge event and previously display the content enlarged to correspond to the calculated enlarging ratio as a UI to allow the user to intuitively preview her desired enlarge event. The electronic device may enlarge and display only content to correspond to the calculated enlarging ratio without resizing the display through the UI or may resize the display and enlarge and display the content to correspond to the calculated enlarging ratio.

In operation 707, the electronic device (e.g., any of the electronic device 101 of FIG. 1, the electronic device 201 of FIGS. 2A, 2B, and 2C, and the electronic device 301 of FIG. 3) may enlarge the content to correspond to the enlarging ratio.

In operation 709, the electronic device (e.g., any of the electronic device 101 of FIG. 1, the electronic device 201 of FIGS. 2A, 2B, and 2C, and the electronic device 301 of FIG. 3) may identify whether the enlarging ratio exceeds a first size corresponding to the total size of the first area A1 and second area A2 of the display (e.g., the display 360 of FIG. 3).

According to an embodiment, the electronic device may identify whether the size of the content enlarged in the enlarging ratio exceeds the first size corresponding to the size of the display in the third state (e.g., the third state of FIG. 2C) in which the second area A2 is exposed along with exposure of the first area A1 of the display.

In operation 711, the electronic device (e.g., any of the electronic device 101 of FIG. 3) may switch into the third state of resizing the display by exposing the entire second area A2 to the outside of the first housing (e.g., the first housing 211 of FIGS. 2A, 2B, and 2C) of the electronic device.

According to an embodiment, when the enlarging ratio corresponding to the enlarge event is a change in a predetermined ratio or more, the electronic device may expose the second area A2 to the outside of the first housing 211 to thereby switch into the third state.

According to an embodiment, the electronic device may switch from the state in which the entire first area A1 of the display is exposed to the outside of the first housing 211 to the third state in which the entire second area A2 of the display is exposed to the outside of the first housing 211.

In operation 713, the electronic device (e.g., any of the electronic device 101 of FIG. 1, the electronic device 201 of FIGS. 2A, 2B, and 2C, and the electronic device 301 of FIG. 3) may display the enlarged content on the resized display (e.g., the display 360 of FIG. 3) in the third state (e.g., the third state of FIG. 2C).

According to an embodiment, the electronic device may display the enlarged content on the display resized in the third state in which the entire first area A1 of the display and the entire second area A2 to correspond to the enlarging ratio are exposed.

Figure 8:
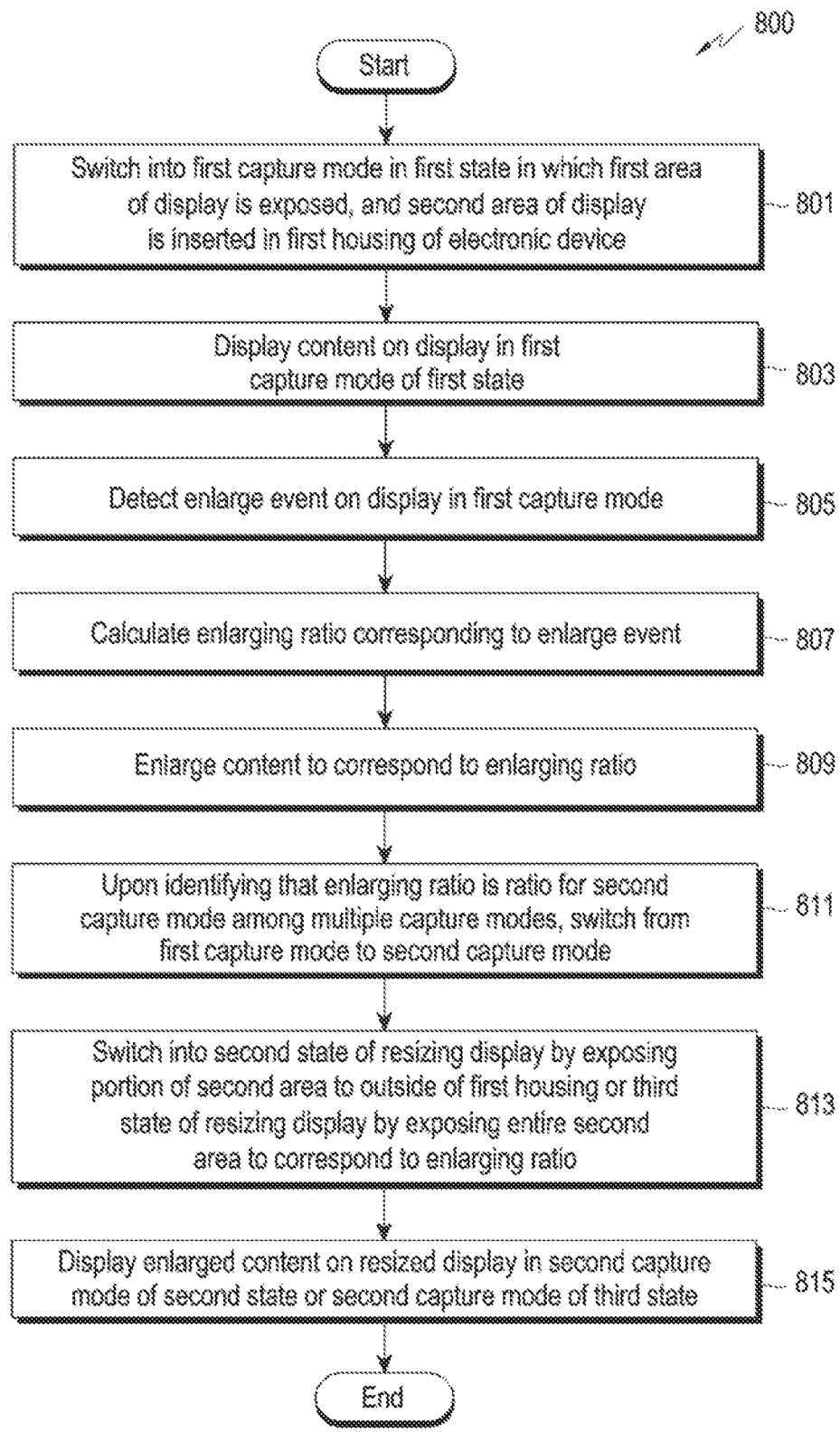
FIG. 8 is a flowchart illustrating an operation of displaying enlarged content in an electronic device according to various embodiments.

FIG. 8 is a flowchart 800 illustrating an operation of displaying enlarged content in an electronic device according to various embodiments. The operation of displaying content may include operations 801 to 815. According to an embodiment, at least one of operations 801 to 815 may be omitted or changed in order or may add other operations.

In operation 801, the electronic device (e.g., any of the electronic device 101 of FIG. 1, the electronic device 201 of FIGS. 2A, 2B, and 2C, and the electronic device 301 of FIG. 3) may switch into the first capture mode in the first state in which the first area A1 of the display (e.g., the display 360 of FIG. 3) is exposed, and the second area A2 of the display is inserted in the first housing (e.g., the first housing 211 of FIGS. 2A, 2B, and 2C).

According to an embodiment, the electronic device may switch into the first capture mode in the first state in which the entire first area A1 of the display is exposed to the outside of the first housing 211, and the entire second area A2 of the display is inserted into the inside of the first housing 211.

According to an embodiment, the electronic device may activate the camera application in the first state and switch into the first capture mode by the default capture mode setting or user's selection.

In operation 803, the electronic device (e.g., any of the electronic device 101 of FIG. 1, the electronic device 201 of FIGS. 2A, 2B, and 2C, and the electronic device 301 of FIG. 3) may display content on the display (e.g., the display 360 of FIG. 3) in the first capture mode.

According to an embodiment, the electronic device may display, on the display, the content received through the camera module (e.g., the camera module 180 of FIG. 1) in the first capture mode of the first state in which only the first area A1 of the display is exposed.

In operation 805, the electronic device (e.g., any of the electronic device 101 of FIG. 1, the electronic device 201 of FIGS. 2A, 2B, and 2C, and the electronic device 301 of FIG. 3) may detect an enlarge event on the display (e.g., the display 360 of FIG. 3).

According to an embodiment, the electronic device may detect the enlarge event in the first area A1 while displaying content in the first area A1 of the display.

According to an embodiment, the electronic device may detect a pinch zoom in action, performed as multi-touch on the display, as the enlarge event.

According to an embodiment, the electronic device may provide an object (e.g., floating icon) for detecting an enlarge or shrink event on the display and detect a user input (e.g., drag-up) on the object as the enlarge event.

In operation 807, the electronic device (e.g., any of the electronic device 101 of FIG. 1, the electronic device 201 of FIGS. 2A, 2B, and 2C, and the electronic device 301 of FIG. 3) may calculate the enlarging ratio corresponding to the enlarge event.

According to an embodiment, the electronic device may calculate the enlarging ratio corresponding to the enlarge event with respect to the current ratio of the content being displayed in the first area A1 of the display where the enlarge event is detected.

According to an embodiment, the electronic device may calculate the enlarging ratio based on a change in the coordinates of the multi-touch for performing the enlarge event.

According to an embodiment, the electronic device may calculate the enlarging ratio corresponding to the enlarge event and previously display the capture mode corresponding to the calculated enlarging ratio as a UI to allow the user to select her desired capture mode. The electronic device may provide the type of the capture mode corresponding to the calculated enlarging ratio and whether to resize the display for the capture mode, through the UI.

The electronic device may switch into the capture mode corresponding to the calculated enlarging ratio and display content without resizing the display or may resize the display, switch into the capture mode corresponding to the calculated enlarging ratio and display content. In operation 809, the electronic device (e.g., any of the electronic device 101 of FIG. 1, the electronic device 201 of FIGS. 2A, 2B, and 2C, and the electronic device 301 of FIG. 3) may enlarge the content to correspond to the enlarging ratio.

In operation 811, upon identifying that the enlarging ratio is a ratio for the second capture mode among the plurality of capture modes, the electronic device (e.g., any of the electronic device 101 of FIG. 1, the electronic device 201 of FIGS. 2A, 2B, and 2C, and the electronic device 301 of FIG. 3) may switch from the first capture mode to the second capture mode.

According to an embodiment, the electronic device may identify the second capture mode having the ratio corresponding to the enlarging ratio among the ratios for the plurality of capture modes, respectively.

In operation 813, the electronic device (e.g., any of the electronic device 101 of FIG. 1, the electronic device 201 of FIGS. 2A, 2B, and 2C, and the electronic device 301 of FIG. 3) may switch into the second state of resizing the display (e.g., the display 360 of FIG. 3) by exposing a portion of the second area A2 to the outside of the first housing (e.g., the first housing 211 of FIGS. 2A, 2B, and 2C) of the electronic device to correspond to the enlarging ratio or the third state of resizing the display by exposing the entire second area A2.

According to an embodiment, when the enlarging ratio corresponding to the enlarge event is a change in a predetermined ratio or more, the electronic device may expose the second area A2 to the outside of the first housing 211 to thereby switch into the second state or the third state.

According to an embodiment, the electronic device may switch from the state in which the entire first area A1 of the display is exposed to the outside of the first housing 211 into the second state in which a portion of the second area A2 of the display is exposed to the outside of the first housing 211 or the third state in which the entire second area A2 of the display is exposed to the outside of the first housing 211.

In operation 815, the electronic device (e.g., any of the electronic device 101 of FIG. 1, the electronic device 201 of FIGS. 2A, 2B, and 2C, and the electronic device 301 of FIG. 3) may display enlarged content on the display (e.g., the display 360 of FIG. 3) resized in the second capture mode of the second state (e.g., the second state of FIG. 2B) or the second capture mode of the third state (e.g., the third state of FIG. 2C).

According to an embodiment, the electronic device may display the enlarged content in the ratio for the second capture mode on the display resized in the second state in which the entire first area A1 of the display and a portion of the second area A2 to correspond to the enlarging ratio is exposed.

According to an embodiment, the electronic device may display the enlarged content in the ratio for the second capture mode on the display resized in the third state in which the entire first area A1 of the display and the entire second area A2 to correspond to the enlarging ratio are exposed.

FIGS. 9A, 9B, 9C, and 9D are views 900a, 900b, 900c, and 900d respectively illustrating an operation of displaying enlarged content in an electronic device according to various embodiments.

Figure 9A:
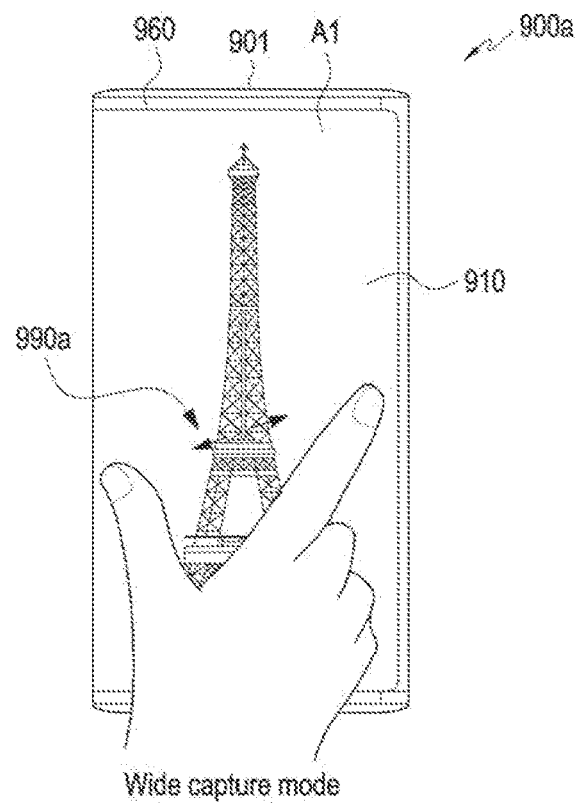
FIGS. 9A, 9B, 9C, and 9D are views illustrating an operation of displaying enlarged content in an electronic device according to various embodiments.

As shown in FIG. 9A, an electronic device 901 (e.g., any of the electronic device 101 of FIG. 1, the electronic device 201 of FIGS. 2A, 2B, and 2C, and the electronic device 301 of FIG. 3) may switch into the first capture mode (e.g., wide capture mode) in a first state (e.g., the first state of FIG. 2A) in which the first area A1 of the display 960 (e.g., the display 360 of FIG. 3) is exposed, and the entire second area A2 of the display 960 is inserted in the first housing (e.g., the first housing 211 of FIGS. 2A, 2B, and 2C) of the electronic device 601 and, in the first capture mode, detect an enlarge event 990a in the first area A1 of the display 960 while displaying content 910 in the first area A1 of the display 960. According to an embodiment, the electronic device may calculate the enlarging ratio corresponding to the enlarge event with respect to the current ratio of the content being displayed in the first area A1 of the display 960 where the enlarge event 990a is detected. Upon identifying that the enlarging ratio is a change in a predetermined ratio or less, the electronic device may display the content enlarged to correspond to the enlarging ratio in the first area A1 of the display 660 without resizing the display 660 and changing the capture mode as shown in FIG. 9B.

Figure 9B:
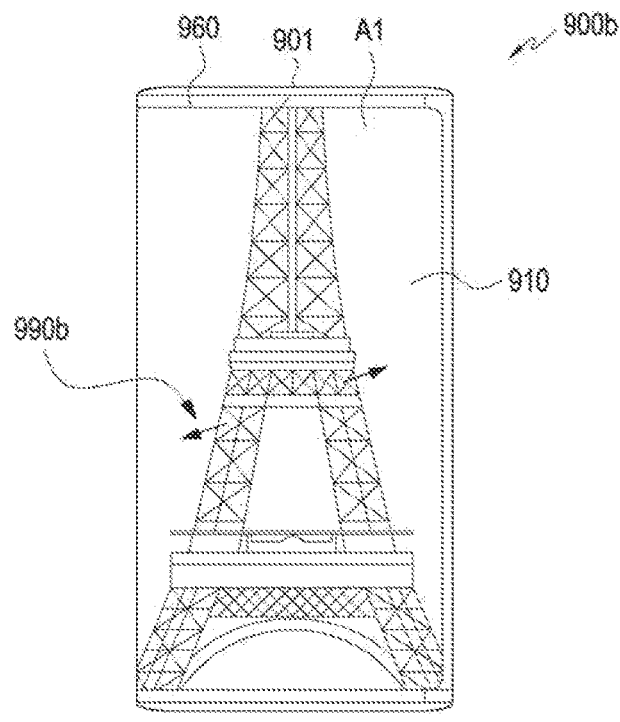

As shown in FIG. 9B, upon detecting an enlarge event 990b on the display 960 while displaying the content enlarged to correspond to the enlarging ratio in the first area A1 of the display 960 in the first capture mode (e.g., wide capture mode), the electronic device 901 may calculate the enlarging ratio corresponding to the enlarge event with respect to the current ratio of the content being displayed on the display 960 where the enlarge event 990b is detected. Upon identifying that the enlarging ratio is the change in the predetermined ratio or more and that the enlarging ratio is a ratio for the second capture mode (e.g., telephoto capture mode) among the plurality of capture modes, the electronic device 901 may switch from the first capture mode to the second capture mode and display the content enlarged to correspond to the enlarging ratio on the resized display 960 in the second state (e.g., the second state of FIG. 2B) of resizing the display 960 by exposing a portion of the second area A2 corresponding to the enlarging ratio to the outside of the first housing as shown in FIG. 9C.

Figure 9C:
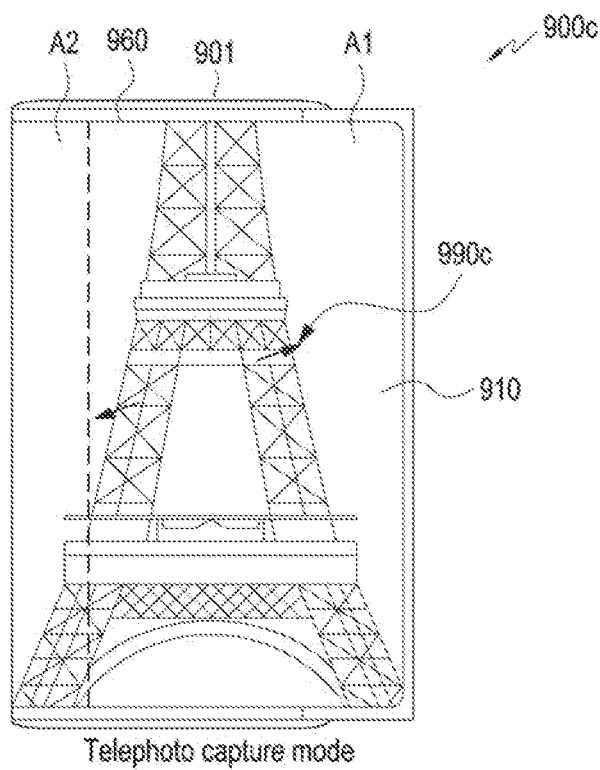
Figure 9D:
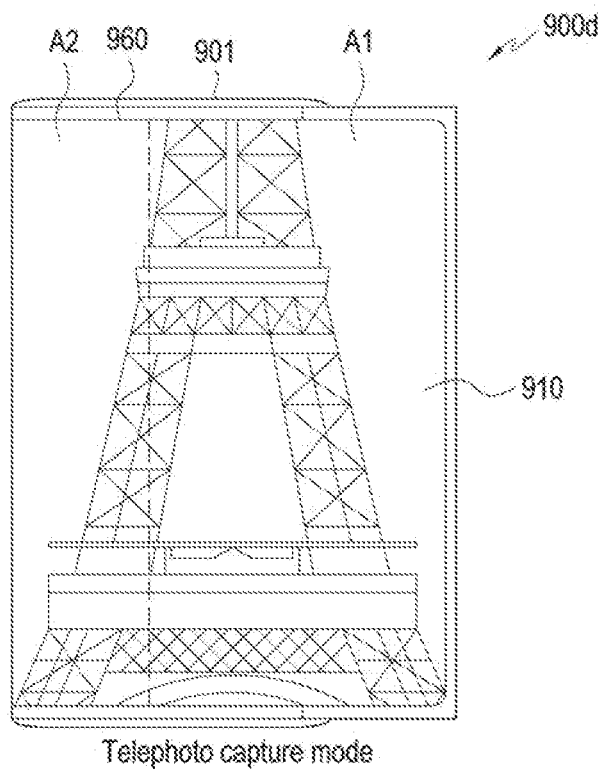

As shown in FIG. 9C, upon detecting an enlarge event 990c on the display 960 while displaying the content enlarged to correspond to the enlarging ratio in the first area A1 and a portion of the second area A2 of the display 960, the electronic device 901 may calculate the enlarging ratio corresponding to the enlarge event with respect to the current ratio of the content being displayed on the display 960 where the enlarge event 990c is detected. Upon identifying that the enlarging ratio is the change in the predetermined ratio or more, the electronic device 601 may maintain the second capture mode (e.g., telephoto mode) and display the content enlarged to correspond to the enlarging ratio on the resized display 960 in the second state of resizing the display 960 by further exposing a portion of the second area A2 corresponding to the enlarging ratio to the outside of the first housing as shown in FIG. 9D.

Figure 10:
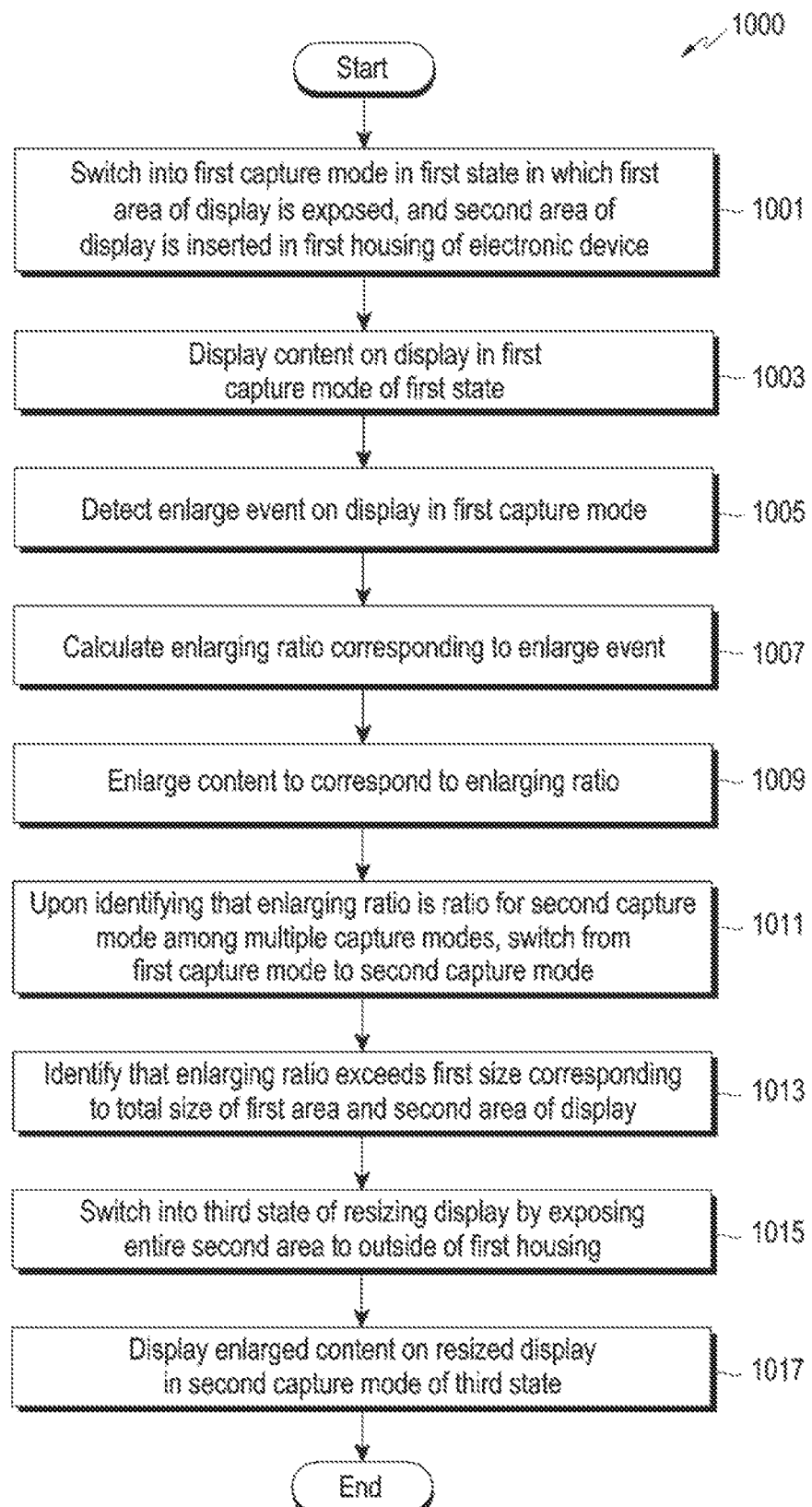
FIG. 10 is a flowchart illustrating an operation of displaying enlarged content in an electronic device according to various embodiments.

FIG. 10 is a flowchart 1000 illustrating an operation of displaying enlarged content in an electronic device according to various embodiments. The operation of displaying content may include operations 1001, 1003, 1005, 1007, 1009, 1011, 1013, 1015, and 1017. According to an embodiment, at least one of operations 1001, 1003, 1005, 1007, 1009, 1011, 1013, 1015, and 1017 may be omitted or changed in order or may add other operations.

In operation 1001, the electronic device (e.g., any of the electronic device 101 of FIG. 1, the electronic device 201 of FIGS. 2A, 2B, and 2C, and the electronic device 301 of FIG. 3) may switch into the first capture mode in the first state in which the first area A1 of the display (e.g., the display 360 of FIG. 3) is exposed, and the second area A2 of the display is inserted in the first housing (e.g., the first housing 211 of FIGS. 2A, 2B, and 2C).

According to an embodiment, the electronic device may switch into the first capture mode in the first state in which the entire first area A1 of the display is exposed to the outside of the first housing 211, and the entire second area A2 of the display is inserted into the inside of the first housing 211.

According to an embodiment, the electronic device may activate the camera application in the first state and switch into the first capture mode by the default capture mode setting or user's selection.

In operation 1003, the electronic device (e.g., any of the electronic device 101 of FIG. 1, the electronic device 201 of FIGS. 2A, 2B, and 2C, and the electronic device 301 of FIG. 3) may display content on the display (e.g., the display 360 of FIG. 3) in the first capture mode.

According to an embodiment, the electronic device may display, on the display, the content received through the camera module (e.g., the camera module 180 of FIG. 1) in the first capture mode of the first state in which only the first area A1 of the display is exposed.

In operation 1005, the electronic device (e.g., any of the electronic device 101 of FIG. 1, the electronic device 201 of FIGS. 2A, 2B, and 2C, and the electronic device 301 of FIG. 3) may detect an enlarge event on the display (e.g., the display 360 of FIG. 3).

According to an embodiment, the electronic device may detect the enlarge event in the first area A1 while displaying content in the first area A1 of the display.

According to an embodiment, the electronic device may detect a pinch zoom in action, performed as multi-touch on the display, as the enlarge event.

According to an embodiment, the electronic device may provide an object (e.g., floating icon) for detecting an enlarge or shrink event on the display and detect a user input (e.g., drag-up) on the object as the enlarge event.

In operation 1007, the electronic device (e.g., any of the electronic device 101 of FIG. 1, the electronic device 201 of FIGS. 2A, 2B, and 2C, and the electronic device 301 of FIG. 3) may calculate the enlarging ratio corresponding to the enlarge event.

According to an embodiment, the electronic device may calculate the enlarging ratio corresponding to the enlarge event with respect to the current ratio of the content being displayed in the first area A1 of the display where the enlarge event is detected. According to an embodiment, the electronic device may calculate the enlarging ratio based on a change in the coordinates of the multi-touch for performing the enlarge event.

According to an embodiment, the electronic device may calculate the enlarging ratio corresponding to the enlarge event and previously display the capture mode corresponding to the calculated enlarging ratio as a UI to allow the user to select her desired capture mode. The electronic device may provide the type of the capture mode corresponding to the calculated enlarging ratio and whether to resize the display for the capture mode, through the UI. In operation 1009, the electronic device (e.g., any of the electronic device 101 of FIG. 1, the electronic device 201 of FIGS. 2A, 2B, and 2C, and the electronic device 301 of FIG. 3) may enlarge the content to correspond to the enlarging ratio.

In operation 1011, upon identifying that the enlarging ratio is a ratio for the second capture mode among the plurality of capture modes, the electronic device (e.g., any of the electronic device 101 of FIG. 1, the electronic device 201 of FIGS. 2A, 2B, and 2C, and the electronic device 301 of FIG. 3) may switch from the first capture mode to the second capture mode.

According to an embodiment, the electronic device may identify the second capture mode having the ratio corresponding to the enlarging ratio among the ratios for the plurality of capture modes, respectively.

In operation 1013, the electronic device (e.g., any of the electronic device 101 of FIG. 1, the electronic device 201 of FIGS. 2A, 2B, and 2C, and the electronic device 301 of FIG. 3) may identify whether the enlarging ratio exceeds a first size corresponding to the total size of the first area A1 and second area A2 of the display (e.g., the display 360 of FIG. 3).

According to an embodiment, the electronic device may identify whether the size of the content enlarged in the enlarging ratio exceeds the first size corresponding to the size of the display in the third state (e.g., the third state of FIG. 2C) in which the second area A2 is exposed along with exposure of the first area A1 of the display.

In operation 1015, the electronic device (e.g., any of the electronic device 101 of FIG. 1, the electronic device 201 of FIGS. 2A, 2B, and 2C, and the electronic device 301 of FIG. 3) may switch into the third state of resizing the display by exposing the entire second area A2 to the outside of the first housing (e.g., the first housing 211 of FIGS. 2A, 2B, and 2C) of the electronic device.

According to an embodiment, when the enlarging ratio corresponding to the enlarge event is a change in a predetermined ratio or more, the electronic device may expose the second area A2 to the outside of the first housing 211 to thereby switch into the third state.

According to an embodiment, the electronic device may switch from the state in which the entire first area A1 of the display is exposed to the outside of the first housing 211 to the third state in which the entire second area A2 of the display is exposed to the outside of the first housing 211.

In operation 1017, the electronic device (e.g., any of the electronic device 101 of FIG. 1, the electronic device 201 of FIGS. 2A, 2B, and 2C, and the electronic device 301 of FIG. 3) may display the enlarged content on the resized display (e.g., the display 360 of FIG. 3) in the second capture mode of the third state (e.g., the third state of FIG. 2C).

According to an embodiment, the electronic device may display the enlarged content in the ratio for the second capture mode on the display resized in the third state in which the entire first area A1 of the display and the entire second area A2 to correspond to the enlarging ratio are exposed.

Figure 11:
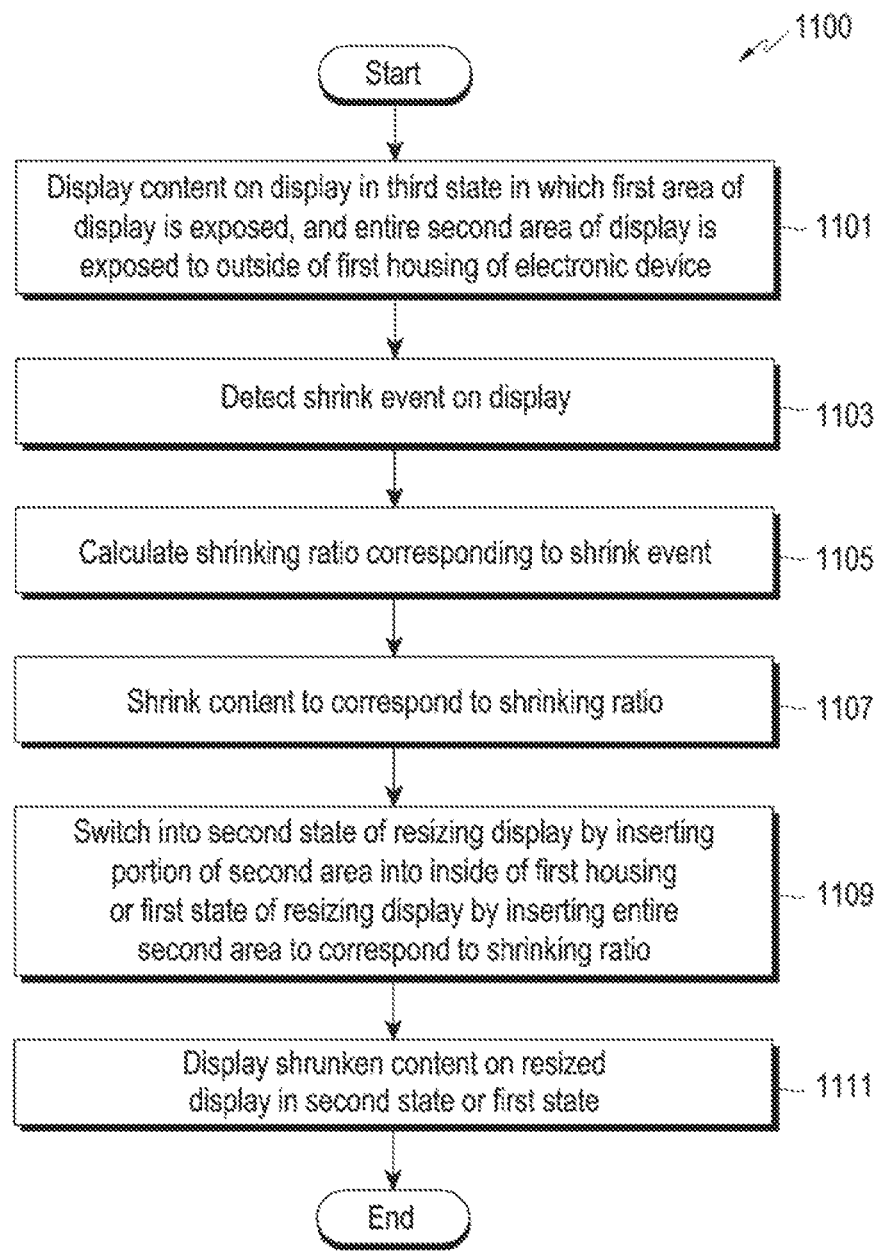
FIG. 11 is a flowchart illustrating an operation of displaying shrunken content in an electronic device according to various embodiments.

FIG. 11 is a flowchart 1100 illustrating an operation of displaying shrunken content in an electronic device according to various embodiments. The operation of displaying content may include operations 1101, 1103, 1105, 1107, 1109, and 1111. According to an embodiment, at least one of operations 1101, 1103, 1105, 1107, 1109, and 1111 may be omitted or changed in order or may add other operations.

In operation 1101, the electronic device (e.g., any of the electronic device 101 of FIG. 1, the electronic device 201 of FIGS. 2A, 2B, and 2C, and the electronic device 301 of FIG. 3) may display content on the display in the third state (e.g., the third state of FIG. 2C) in which the first area A1 of the display (e.g., the display 360 of FIG. 3) is exposed, and the entire second area A2 of the display is exposed to the outside of the first housing (e.g., the first housing 211 of FIGS. 2A, 2B, and 2C).

According to an embodiment, the electronic device may display the content on the display in the first state in which the entire first area A1 of the display is exposed to the outside of the first housing 211, and the entire second area A2 of the display is exposed to the outside of the first housing 211.

In operation 1103, the electronic device (e.g., any of the electronic device 101 of FIG. 1, the electronic device 201 of FIGS. 2A, 2B, and 2C, and the electronic device 301 of FIG. 3) may detect a shrink event on the display (e.g., the display 360 of FIG. 3).

According to an embodiment, the electronic device may detect the shrink event on the display while displaying content on the display.

According to an embodiment, the electronic device may detect a pinch zoom out action, performed as multi-touch on the display, as the shrink event.

According to an embodiment, the electronic device may provide an object (e.g., floating icon) for detecting an enlarge or shrink event on the display and detect a user input (e.g., drag-down) on the object as the shrink event.

In operation 1105, the electronic device (e.g., any of the electronic device 101 of FIG. 1, the electronic device 201 of FIGS. 2A, 2B, and 2C, and the electronic device 301 of FIG. 3) may calculate the shrinking ratio corresponding to the shrink event.

According to an embodiment, the electronic device may calculate the shrinking ratio corresponding to the shrink event with respect to the current ratio of the content being displayed on the display where the shrink event is detected.

According to an embodiment, the electronic device may calculate the shrinking ratio based on a change in the coordinates of the multi-touch for performing the shrink event.

According to an embodiment, the electronic device may calculate the shrinking ratio corresponding to the shrink event and previously display the content shrunken to correspond to the calculated shrinking ratio as a UI to allow the user to intuitively preview her desired shrink event. The electronic device may shrink and display only content to correspond to the calculated shrinking ratio without resizing the display through the UI or may resize the display and shrink and display the content to correspond to the calculated shrinking ratio.

In operation 1107, the electronic device (e.g., any of the electronic device 101 of FIG. 1, the electronic device 201 of FIGS. 2A, 2B, and 2C, and the electronic device 301 of FIG. 3) may shrink the content to correspond to the shrinking ratio.

In operation 1109, the electronic device (e.g., any of the electronic device 101 of FIG. 3) may switch into the second state of resizing the display (e.g., the display 360 of FIG. 3) by inserting a portion of the second area A2 into the inside of the first housing (e.g., the first housing 211 of FIGS. 2A, 2B, and 2C) of the electronic device to correspond to the shrinking ratio or the first state of resizing the display by inserting the entire second area A2.

According to an embodiment, when the shrinking ratio corresponding to the shrink event is a change in a predetermined ratio or more, the electronic device may insert the second area A2 into the inside of the first housing 211 to thereby switch into the second state or the first state.

According to an embodiment, the electronic device may switch from the state in which the entire first area A1 of the display and the entire second area A2 are exposed to the outside of the first housing 211 into the second state in which a portion of the second area A2 of the display is inserted into the inside of the first housing 211 or the first state in which the entire second area A2 of the display is inserted into the inside of the first housing 211.

In operation 1111, the electronic device (e.g., any of the electronic device 101 of FIG. 1, the electronic device 201 of FIGS. 2A, 2B, and 2C, and the electronic device 301 of FIG. 3) may display shrunken content on the display (e.g., the display 360 of FIG. 3) resized in the second state (e.g., the second state of FIG. 2B) or the first state (e.g., the first state of FIG. 2A).

According to an embodiment, the electronic device may display the shrunken content on the display resized in the second state in which the entire first area A1 of the display and a portion of the second area A2 to correspond to the shrinking ratio are exposed.

According to an embodiment, the electronic device may display the shrunken content on the display resized in the first state in which the entire first area A1 of the display and the entire second area A2 to correspond to the shrinking ratio are exposed.

Figure 12:
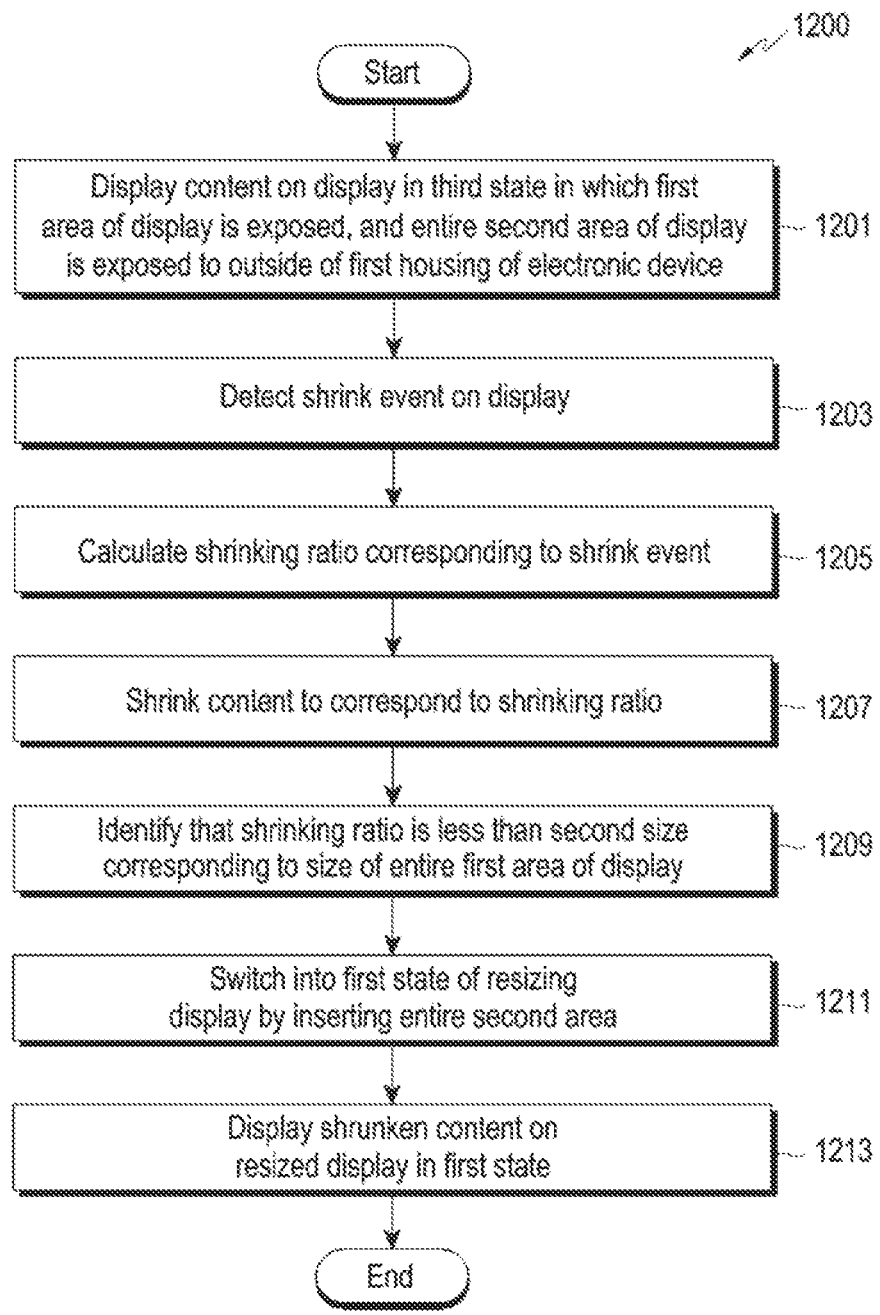
FIG. 12 is a flowchart illustrating an operation of displaying shrunken content in an electronic device according to various embodiments.

FIG. 12 is a flowchart 1200 illustrating an operation of displaying shrunken content in an electronic device according to various embodiments. The operation of displaying content may include operations 1201, 1203, 1205, 1207, 1209, 1211, and 1213. According to an embodiment, at least one of operations 1201, 1203, 1205, 1207, 1209, 1211, and 1213 may be omitted or changed in order or may add other operations.

In operation 1201, the electronic device (e.g., the electronic device 101 of FIG. 1, the electronic device 201 of FIGS. 2A, 2B, and 2C, and the electronic device 301 of FIG. 3) may display content on the display in the third state (e.g., the third state of FIG. 2C) in which the first area A1 of the display (e.g., the display 360 of FIG. 3) is exposed, and the entire second area A2 of the display is exposed to the outside of the first housing (e.g., the first housing 211 of FIGS. 2A, 2B, and 2C).

According to an embodiment, the electronic device may display the content on the display in the first state in which the entire first area A1 of the display is exposed to the outside of the first housing 211, and the entire second area A2 of the display is exposed to the outside of the first housing 211.

In operation 1203, the electronic device (e.g., any of the electronic device 101 of FIG. 1, the electronic device 201 of FIGS. 2A, 2B, and 2C, and the electronic device 301 of FIG. 3) may detect a shrink event on the display (e.g., the display 360 of FIG. 3).

According to an embodiment, the electronic device may detect the shrink event on the display while displaying content on the display.

According to an embodiment, the electronic device may detect a pinch zoom out action, performed as multi-touch on the display, as the shrink event.

According to an embodiment, the electronic device may provide an object (e.g., floating icon) for detecting an enlarge or shrink event on the display and detect a user input (e.g., drag-down) on the object as the shrink event.

In operation 1205, the electronic device (e.g., any of the electronic device 101 of FIG. 1, the electronic device 201 of FIGS. 2A, 2B, and 2C, and the electronic device 301 of FIG. 3) may calculate the shrinking ratio corresponding to the shrink event.

According to an embodiment, the electronic device may calculate the shrinking ratio corresponding to the shrink event with respect to the current ratio of the content being displayed on the display where the shrink event is detected.

According to an embodiment, the electronic device may calculate the shrinking ratio based on a change in the coordinates of the multi-touch for performing the shrink event.

According to an embodiment, the electronic device may calculate the shrinking ratio corresponding to the shrink event and previously display the content shrunken to correspond to the calculated shrinking ratio as a UI to allow the user to intuitively preview her desired shrink event. The electronic device may shrink and display only content to correspond to the calculated shrinking ratio without resizing the display through the UI or may resize the display and shrink and display the content to correspond to the calculated shrinking ratio.

In operation 1207, the electronic device (e.g., any of the electronic device 101 of FIG. 1, the electronic device 201 of FIGS. 2A, 2B, and 2C, and the electronic device 301 of FIG. 3) may shrink the content to correspond to the shrinking ratio.

In operation 1209, the electronic device (e.g., any of the electronic device 101 of FIG. 3) may identify whether the shrinking ratio is less than a second size corresponding to the size of the entire first area A1 of the display (e.g., the display 360 of FIG. 3).

According to an embodiment, the electronic device may identify that the size shrunken in the shrinking ratio is less than the second size corresponding to the size of the display in the first state (e.g., the first state of FIG. 2A) in which only the first area A1 of the display is exposed.

In operation 1211, the electronic device (e.g., any of the electronic device 101 of FIG. 1, the electronic device 201 of FIGS. 2A, 2B, and 2C, and the electronic device 301 of FIG. 3) may switch into the first state of resizing the display by inserting the entire second area A2 into the inside of the first housing (e.g., any of the first housing 211 of FIGS. 2A, 2B, and 2C) of the electronic device.

According to an embodiment, when the shrinking ratio corresponding to the shrink event is a change in a predetermined ratio or more, the electronic device may insert the second area A2 into the inside of the first housing 211 to thereby switch into the first state.

According to an embodiment, the electronic device may switch from the state in which the entire first area A1 and the entire second area A2 of the display are exposed to the outside of the first housing 211 to the first state in which the entire second area A2 of the display is inserted into the inside of the first housing 211.

In operation 1213, the electronic device (e.g., any of the electronic device 101 of FIG. 1, the electronic device 201 of FIGS. 2A, 2B, and 2C, and the electronic device 301 of FIG. 3) may display the shrunken content on the resized display (e.g., the display 360 of FIG. 3) in the first state (e.g., the first state of FIG. 2A).

According to an embodiment, the electronic device may display the shrunken content on the display resized in the first state in which the entire first area A1 of the display is exposed and the entire second area A2 is inserted.

Figure 13:
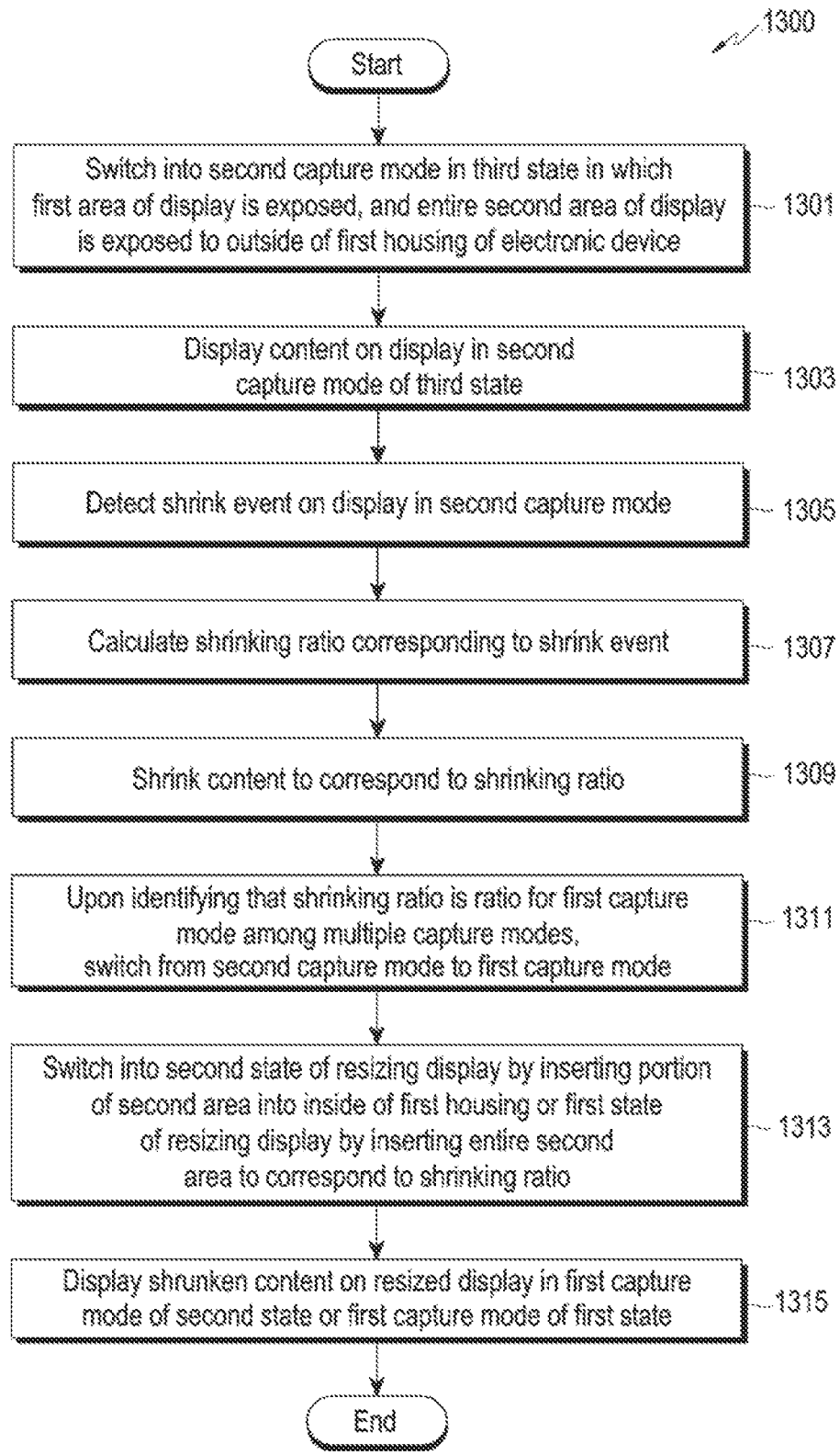
FIG. 13 is a flowchart illustrating an operation of displaying shrunken content in an electronic device according to various embodiments.

FIG. 13 is a flowchart 1300 illustrating an operation of displaying shrunken content in an electronic device according to various embodiments. The operation of displaying content may include operations 1301, 1303, 1305, 1307, 1309, 1311, 1313, and 1315. According to an embodiment, at least one of operations 1301, 1303, 1305, 1307, 1309, 1311, 1313, and 1315 may be omitted or changed in order or may add other operations.

In operation 1301, the electronic device (e.g., any of the electronic device 101 of FIG. 1, the electronic device 201 of FIGS. 2A, 2B, and 2C, and the electronic device 301 of FIG. 3) may switch into the second capture mode in the third state (e.g., the third state of FIG. 2C) in which the first area A1 of the display (e.g., the display 360 of FIG. 3) is exposed, and the entire second area A2 of the display is exposed to the outside of the first housing (e.g., the first housing 211 of FIGS. 2A, 2B, and 2C).

According to an embodiment, the electronic device may switch into the first capture mode in the third state in which the entire first area A1 of the display is exposed to the outside of the first housing 211, and the entire second area A2 of the display is exposed to the outside of the first housing 211.

According to an embodiment, the electronic device may activate the camera application in the third state and switch into the third capture mode by the default capture mode setting or user's selection.

In operation 1303, the electronic device (e.g., the electronic device 101 of FIG. 1, the electronic device 201 of FIGS. 2A, 2B, and 2C, and the electronic device 301 of FIG. 3) may display content on the display (e.g., the display 360 of FIG. 3) in the third capture mode.

According to an embodiment, the electronic device may display, on the display, the content received through the camera module (e.g., the camera module 180 of FIG. 1) in the second capture mode of the third state in which the first area A1 and second area A2 of the display are exposed.

In operation 1305, the electronic device (e.g., any of the electronic device 101 of FIG. 1, the electronic device 201 of FIGS. 2A, 2B, and 2C, and the electronic device 301 of FIG. 3) may detect a shrink event on the display (e.g., the display 360 of FIG. 3) in the second capture mode.

According to an embodiment, the electronic device may detect the shrink event on the display while displaying content on the display.

According to an embodiment, the electronic device may detect a pinch zoom out action, performed as multi-touch on the display, as the shrink event.

According to an embodiment, the electronic device may provide an object (e.g., floating icon) for detecting an enlarge or shrink event on the display and detect a user input (e.g., drag-down) on the object as the shrink event.

In operation 1307, the electronic device (e.g., any of the electronic device 101 of FIG. 1, the electronic device 201 of FIGS. 2A, 2B, and 2C, and the electronic device 301 of FIG. 3) may calculate the shrinking ratio corresponding to the shrink event.

According to an embodiment, the electronic device may calculate the shrinking ratio corresponding to the shrink event with respect to the current ratio of the content being displayed on the display where the shrink event is detected.

According to an embodiment, the electronic device may calculate the shrinking ratio based on a change in the coordinates of the multi-touch for performing the shrink event.

According to an embodiment, the electronic device may calculate the shrinking ratio corresponding to the shrink event and previously display the capture mode corresponding to the calculated shrinking ratio as a UI to allow the user to select her desired capture mode. The electronic device may provide the type of the capture mode corresponding to the calculated shrinking ratio and whether to resize the display for the capture mode, through the UI. In operation 1309, the electronic device (e.g., any of the electronic device 101 of FIG. 1, the electronic device 201 of FIGS. 2A, 2B, and 2C, and the electronic device 301 of FIG. 3) may shrink the content to correspond to the shrinking ratio.

In operation 1311, upon identifying that the shrinking ratio is a ratio for the first capture mode among the plurality of capture modes, the electronic device (e.g., any of the electronic device 101 of FIG. 1, the electronic device 201 of FIGS. 2A, 2B, and 2C, and the electronic device 301 of FIG. 3) may switch from the second capture mode to the first capture mode.

According to an embodiment, the electronic device may identify the first capture mode having the ratio corresponding to the shrinking ratio among the ratios for the plurality of capture modes, respectively.

In operation 1313, the electronic device (e.g., any of the electronic device 101 of FIG. 1, the electronic device 201 of FIGS. 2A, 2B, and 2C, and the electronic device 301 of FIG. 3) may switch into the second state of resizing the display (e.g., the display 360 of FIG. 3) by inserting a portion of the second area A2 into the inside of the first housing (e.g., the first housing 211 of FIGS. 2A, 2B, and 2C) of the electronic device to correspond to the shrinking ratio or the first state of resizing the display by inserting the entire second area A2.

According to an embodiment, when the shrinking ratio corresponding to the shrink event is a change in a predetermined ratio or more, the electronic device may insert the second area A2 into the inside of the first housing 211 to thereby switch into the second state or the first state.

According to an embodiment, the electronic device may switch from the state in which the entire first area A1 of the display and the entire second area A2 are exposed to the outside of the first housing 211 into the second state in which a portion of the second area A2 of the display is inserted into the inside of the first housing 211 or the first state in which the entire second area A2 of the display is inserted into the inside of the first housing 211.

In operation 1315, the electronic device (e.g., any of the electronic device 101 of FIG. 1, the electronic device 201 of FIGS. 2A, 2B, and 2C, and the electronic device 301 of FIG. 3) may display shrunken content on the display (e.g., the display 360 of FIG. 3) resized in the first capture mode of the second state (e.g., the second state of FIG. 2B) or the first capture mode of the first state (e.g., the first state of FIG. 2A).

According to an embodiment, the electronic device may display the content shrunken in the ratio for the first capture mode on the display resized in the second state in which the entire first area A1 of the display and a portion of the second area A2 to correspond to the shrinking ratio are exposed.

According to an embodiment, the electronic device may display the shrunken content in the ratio for the first capture mode on the display resized in the first state in which the entire first area A1 of the display is exposed and the entire second area A2 to correspond to the shrinking ratio is inserted.

Figure 14:
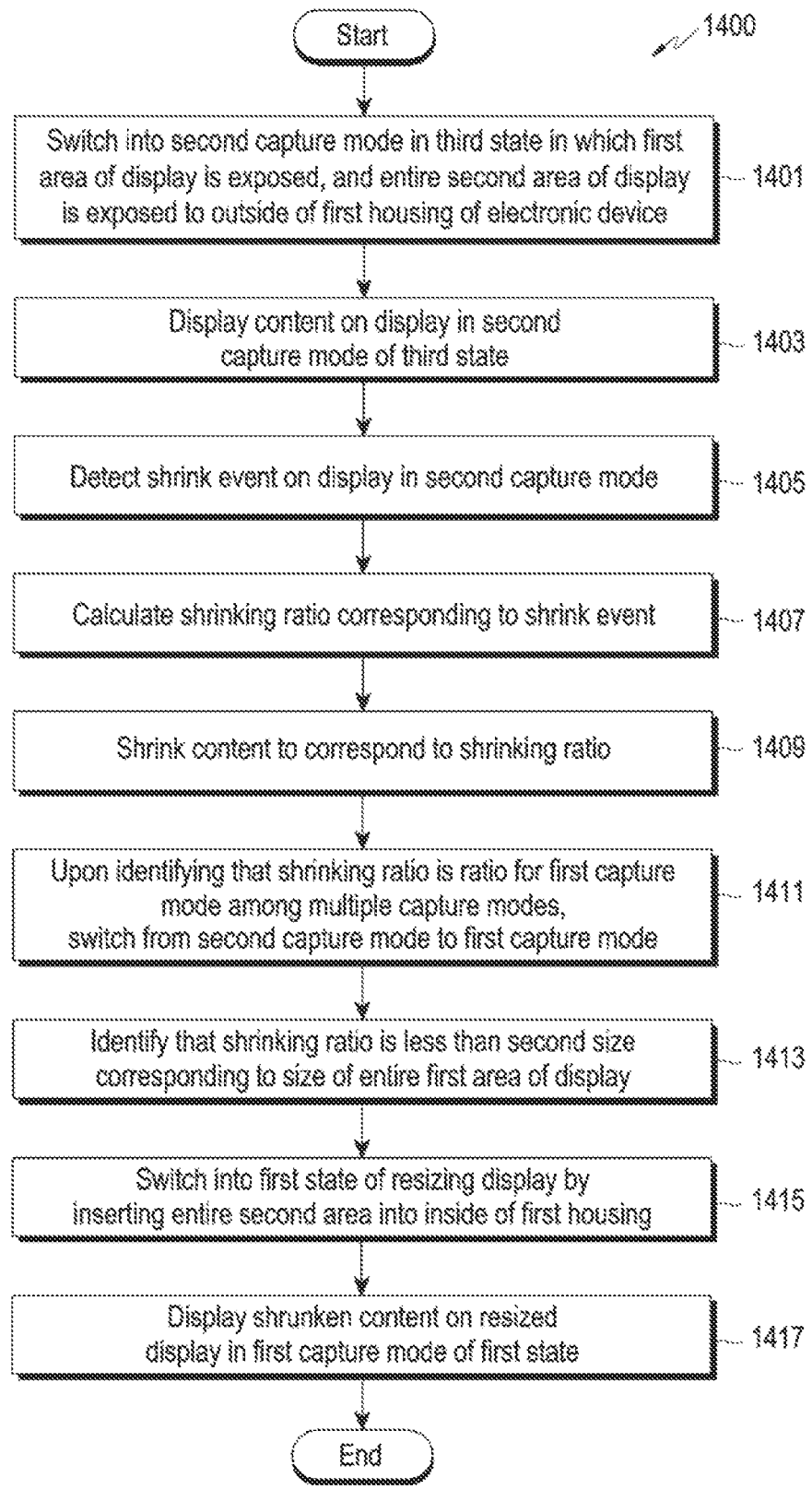
FIG. 14 is a flowchart illustrating an operation of displaying shrunken content in an electronic device according to various embodiments.

FIG. 14 is a flowchart 1400 illustrating an operation of displaying shrunken content in an electronic device according to various embodiments. The operation of displaying content may include operations 1401 to 1417. According to an embodiment, at least one of operations 1401 to 1417 may be omitted or changed in order or may add other operations.

In operation 1401, the electronic device (e.g., any of the electronic device 101 of FIG. 1, the electronic device 201 of FIGS. 2A, 2B, and 2C, and the electronic device 301 of FIG. 3) may switch into the second capture mode in the third state (e.g., the third state of FIG. 2C) in which the first area A1 of the display (e.g., the display 360 of FIG. 3) is exposed, and the entire second area A2 of the display is exposed to the outside of the first housing (e.g., the first housing 211 of FIGS. 2A, 2B, and 2C).

According to an embodiment, the electronic device may switch into the first capture mode in the third state in which the entire first area A1 of the display is exposed to the outside of the first housing 211, and the entire second area A2 of the display is exposed to the outside of the first housing 211.

According to an embodiment, the electronic device may activate the camera application in the third state and switch into the second capture mode by the default capture mode setting or user's selection.

In operation 1403, the electronic device (e.g., any of the electronic device 101 of FIG. 1, the electronic device 201 of FIGS. 2A, 2B, and 2C, and the electronic device 301 of FIG. 3) may display content on the display (e.g., the display 360 of FIG. 3) in the second capture mode.

According to an embodiment, the electronic device may display, on the display, the content received through the camera module (e.g., the camera module 180 of FIG. 1) in the second capture mode of the third state in which the first area A1 and second area A2 of the display are exposed.

In operation 1405, the electronic device (e.g., any of the electronic device 101 of FIG. 1, the electronic device 201 of FIGS. 2A, 2B, and 2C, and the electronic device 301 of FIG. 3) may detect a shrink event on the display (e.g., the display 360 of FIG. 3) in the second capture mode.

According to an embodiment, the electronic device may detect the shrink event on the display while displaying content on the display.

According to an embodiment, the electronic device may detect a pinch zoom out action, performed as multi-touch on the display, as the shrink event.

According to an embodiment, the electronic device may provide an object (e.g., floating icon) for detecting an enlarge or shrink event on the display and detect a user input (e.g., drag-down) on the object as the shrink event.

In operation 1407, the electronic device (e.g., the electronic device 101 of FIG. 1, the electronic device 201 of FIGS. 2A, 2B, and 2C, and the electronic device 301 of FIG. 3) may calculate the shrinking ratio corresponding to the shrink event.

According to an embodiment, the electronic device may calculate the shrinking ratio corresponding to the shrink event with respect to the current ratio of the content being displayed on the display where the shrink event is detected.

According to an embodiment, the electronic device may calculate the shrinking ratio based on a change in the coordinates of the multi-touch for performing the shrink event.

According to an embodiment, the electronic device may calculate the shrinking ratio corresponding to the shrink event and previously display the capture mode corresponding to the calculated shrinking ratio as a UI to allow the user to select her desired capture mode. The electronic device may provide the type of the capture mode corresponding to the calculated shrinking ratio and whether to resize the display for the capture mode, through the UI. In operation 1409, the electronic device (e.g., any of the electronic device 101 of FIG. 1, the electronic device 201 of FIGS. 2A, 2B, and 2C, and the electronic device 301 of FIG. 3) may shrink the content to correspond to the shrinking ratio.

In operation 1411, upon identifying that the shrinking ratio is a ratio for the first capture mode among the plurality of capture modes, the electronic device (e.g., any of the electronic device 101 of FIG. 1, the electronic device 201 of FIGS. 2A, 2B, and 2C, and the electronic device 301 of FIG. 3) may switch from the second capture mode to the first capture mode.

According to an embodiment, the electronic device may identify the first capture mode having the ratio corresponding to the shrinking ratio among the ratios for the plurality of capture modes, respectively.

In operation 1413, the electronic device (e.g., any of the electronic device 101 of FIG. 1, the electronic device 201 of FIGS. 2A, 2B, and 2C, and the electronic device 301 of FIG. 3) may identify that the shrinking ratio is less than a second size corresponding to the size of the entire first area A1 of the display (e.g., the display 360 of FIG. 3).

According to an embodiment, the electronic device may identify that the size shrunken in the shrinking ratio is less than the second size corresponding to the size of the display in the first state (e.g., the first state of FIG. 2A) in which only the first area A1 of the display is exposed.

In operation 1415, the electronic device (e.g., any of the electronic device 101 of FIG. 3) may switch into the first state of resizing the display by inserting the entire second area A2 into the inside of the first housing (e.g., the first housing 211 of FIGS. 2A, 2B, and 2C) of the electronic device.

According to an embodiment, when the shrinking ratio corresponding to the shrink event is a change in a predetermined ratio or more, the electronic device may insert the second area A2 into the inside of the first housing 211 to thereby switch into the first state.

According to an embodiment, the electronic device may switch from the state in which the entire first area A1 and the entire second area A2 of the display are exposed to the outside of the first housing 211 to the first state in which the entire second area A2 of the display is inserted into the inside of the first housing 211.

In operation 1417, the electronic device (e.g., any of the electronic device 101 of FIG. 1, the electronic device 201 of FIGS. 2A, 2B, and 2C, and the electronic device 301 of FIG. 3) may display the shrunken content on the resized display (e.g., the display 360 of FIG. 3) in the first capture mode of the first state (e.g., the first state of FIG. 2A).

According to an embodiment, the electronic device may display the shrunken content in the ratio for the first capture mode on the display resized in the first state in which the entire first area A1 of the display is exposed and the entire second area A2 is inserted.

According to various embodiments, a method for displaying content in an electronic device may comprise detecting an enlarge or shrink event on a display while displaying content on the display in a state in which a first area of the display is exposed, and a second area of the display is inserted or exposed in/from the first housing, resizing the display by exposing or inserting the second area according to an enlarging or shrinking ratio corresponding to the enlarge or shrink event, and displaying content enlarged or shrunken in the enlarging or shrinking ratio on the resized display.

According to various embodiments, the method may further comprise, when the enlarging or shrinking ratio is a change in a predetermined ratio or more, resizing the display by exposing the second area to the outside of the first housing or inserting the second area into the inside of the first housing.

According to various embodiments, the method may further comprise detecting an enlarge event on the display while displaying the content on the display in a first state in which the first area is exposed, and the entire second area is inserted in the first housing;

switching into a second state of resizing the display by exposing a portion of the second area to the outside of the first housing or a third state of resizing the display by exposing the entire second area to the outside of the first housing according to an enlarging ratio corresponding to the enlarge event, and displaying the content enlarged in the enlarging ratio on the resized display in the second state or the third state.

According to various embodiments, the method may further comprise detecting an enlarge event on the display while displaying the content on the display in a first state in which the first area is exposed, and the entire second area is inserted in the first housing and, if an enlarging ratio corresponding to the enlarge event exceeds a first size corresponding to a total size of the first area and the second area of the display, switching into a third state of resizing the display by exposing the entire second area to the outside of the first housing and displaying the content enlarged in the enlarging ratio on the resized display in the third state.

According to various embodiments, the method may further comprise switching into a first capture mode in a first state in which the first area is exposed, and the entire second area is inserted in the first housing; detecting an enlarge event on the display while displaying the content on the display in the first capture mode;

upon identifying that an enlarging ratio corresponding to the enlarge event is a ratio for a second capture mode among a plurality of capture modes, switching from the first capture mode to the second capture mode, switching into a second state of resizing the display by exposing a portion of the second area to the outside of the first housing or a third state of resizing the display by exposing the entire second area to the outside of the first housing according to an enlarging ratio corresponding to the enlarge event, and displaying the content enlarged in the enlarging ratio on the resized display in the second capture mode of the second state or the second capture mode of the third state.

According to various embodiments, the method may further comprise switching into a first capture mode in a first state in which the first area is exposed, and the entire second area is inserted in the first housing, detecting an enlarge event on the display while displaying the content on the display in the first capture mode and, upon identifying that an enlarging ratio corresponding to the enlarge event is a ratio for a second capture mode among a plurality of capture modes, switch from the first capture mode to the second capture mode, and if the enlarging ratio exceeds a first size corresponding to a total size of the first area and the second area of the display, switching into a third state of resizing the display by exposing the entire second area to the outside of the first housing and displaying the content enlarged in the enlarging ratio on the resized display in the second capture mode of the third state.

According to various embodiments, the method may further comprise detecting a shrink event on the display while displaying the content on the display in a third state in which the first area is exposed, and the entire second area is exposed to the outside of the first housing, switching into a second state of resizing the display by inserting a portion of the second area into the inside of the first housing or a first state of resizing the display by inserting the entire second area into the inside of the first housing according to a shrinking ratio corresponding to the shrink event, and displaying the content shrunken in the shrinking ratio on the resized display in the second state or the first state.

According to various embodiments, the method may further comprise detecting a shrink event on the display while displaying the content on the display in a third state in which the first area is exposed, and the entire second area is exposed to the outside of the first housing and, if a shrinking ratio corresponding to the shrink event is less than a second size corresponding to a size of the entire first area of the display, switching into a first state of resizing the display by inserting the entire second area into the inside of the first housing, and displaying the content shrunken in the shrinking ratio on the resized display in the first state.

According to various embodiments, the method may further comprise switching into a second capture mode in a third state in which the first area is exposed, and the entire second area is exposed to the outside of the first housing, detecting a shrink event on the display while displaying the content on the display in the second capture mode and, upon identifying that a shrinking ratio corresponding to the shrink event is a ratio for a first capture mode among a plurality of capture modes, switching from the second capture mode to the first capture mode, and if switching into a second state of resizing the display by inserting a portion of the second area into the inside of the first housing or a first state of resizing the display by inserting the entire second area into the inside of the first housing according to the shrinking ratio, displaying the content shrunken in the shrinking ratio on the resized display in the first capture mode of the second state or the first capture mode of the first state.

According to various embodiments, the method may further comprise switching into a second capture mode in a third state in which the first area is exposed, and the entire second area is exposed to the outside of the first housing, detecting a shrink event on the display while displaying the content on the display in the second capture mode and, upon identifying that a shrinking ratio corresponding to the shrink event is a ratio for a first capture mode among a plurality of capture modes, switching from the second capture mode to the first capture mode, and if the shrinking ratio is less than a second size corresponding to a size of the entire first area of the display, switching into a first state of resizing the display by inserting the entire second area into the inside of the first housing and displaying the content shrunken in the shrinking ratio on the resized display in the first capture mode of the first state.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a flexible display comprising a first area and a second area extending from the first area, the second area being configured to be inserted into an inside of a housing of the electronic device or exposed to an outside of the housing;
a processor; and
memory for storing instructions that, when executed by the processor, cause the electronic device to:
based on detecting a first touch input or a second touch input corresponding to an enlarge event or a shrink event on the display while displaying content on the display in a state in which the first area is exposed and the second area is inserted in or exposed from the housing, resize the display by exposing the second area according to an enlarging ratio corresponding to the enlarge event or inserting the second area according to an shrinking ratio corresponding to the shrink event, and display content resized according to the enlarging ratio or the shrinking ratio on the resized display, switch to a first capture mode in a first state in which the first area is exposed and an entirety of the second area is inserted in the housing, detect the first touch input corresponding to the enlarge event on the display while displaying the content on the display in the first capture mode, and, based on identifying that the enlarging ratio corresponding to the enlarge event is a ratio for a second capture mode among a plurality of capture modes, switch from the first capture mode to the second capture mode, and at least one of:
- based on switching to a second state of resizing the display by exposing a portion of the second area to the outside of the housing or a third state of resizing the display by exposing the entirety of the second area to the outside of the housing according to the enlarging ratio corresponding to the enlarge event, display the content enlarged in the enlarging ratio on the resized display in the second capture mode of the second state or the second capture mode of the third state, and
- based on the enlarging ratio exceeding a first size corresponding to a total size of the first area and the second area of the display, switch to the third state and display the content enlarged in the enlarging ratio on the resized display in the second capture mode of the third state.

2. The electronic device of claim 1, wherein the instructions, when executed by the processor, cause the electronic device to:
based on the enlarging ratio or the shrinking ratio being a change in a predetermined ratio or more, resize the display by exposing the second area to the outside of the housing or inserting the second area into the inside of the housing.

3. The electronic device of claim 1, wherein the instructions, when executed by the processor, cause the electronic device to:
based on detecting the first touch input corresponding to the enlarge event on the display while displaying the content on the display in the first state, switch to the second state or the third state, and
display the content enlarged in the enlarging ratio on the resized display in the second state or the third state.

4. The electronic device of claim 1, wherein the instructions, when executed by the processor, cause the electronic device to:
detect the first touch input corresponding to the enlarge event on the display while displaying the content on the display in the first state,
based on the enlarging ratio corresponding to the enlarge event exceeding the first size, switch to the third state, and
display the content enlarged in the enlarging ratio on the resized display in the third state.

5. The electronic device of claim 1, wherein the instructions, when executed by the processor, cause the electronic device to:
based on detecting the second touch input corresponding to the shrink event on the display while displaying the content on the display in the third state, switch to the second state or the first state, and
display the content shrunken in the shrinking ratio on the resized display in the second state or the first state.

6. The electronic device of claim 1, wherein the instructions, when executed by the processor, cause the electronic device to:
detect the second touch input corresponding to the shrink event on the display while displaying the content on the display in the third state, and, based on the shrinking ratio being less than a second size corresponding to a size of an entirety of the first area of the display, switch to the first state of resizing the display by inserting the entirety of the second area into the inside of the housing, and
display the content shrunken in the shrinking ratio on the resized display in the first state.

7. The electronic device of claim 1, wherein the instructions, when executed by the processor, cause the electronic device to:
switch to the second capture mode in the third state in which the first area is exposed and the entirety of the second area is exposed to the outside of the housing, detect the second touch input corresponding to the shrink event on the display while displaying the content on the display in the second capture mode, and, based on identifying that the shrinking ratio corresponding to the shrink event is a ratio for the first capture mode among the plurality of capture modes, switch from the second capture mode to the first capture mode, and
based on switching to the second state or the first state of resizing the display by inserting the entirety of the second area into the inside of the housing according to the shrinking ratio, display the content shrunken in the shrinking ratio on the resized display in the first capture mode of the second state or the first capture mode of the first state.

8. The electronic device of claim 1, wherein the instructions, when executed by the processor, cause the electronic device to:
switch into the second capture mode in the third state in which the first area is exposed and the entirety of the second area is exposed to the outside of the housing, detect the second touch input corresponding to the shrink event on the display while displaying the content on the display in the second capture mode, and based on identifying that the shrinking ratio corresponding to the shrink event is a ratio for the first capture mode among the plurality of capture modes, switch from the second capture mode to the first capture mode, and
based on the shrinking ratio being less than a second size corresponding to a size of an entirety of the first area of the display, switch to the first state of resizing the display by inserting the entirety of the second area into the inside of the housing and display the content shrunken in the shrinking ratio on the resized display in the first capture mode of the first state.

9. A method for displaying content in an electronic device, the method comprising:
detecting a first touch input or a second touch input corresponding to an enlarge event or a shrink event on a flexible display of the electronic device while displaying content on the display in a state in which a first area of the display is exposed and a second area of the display is inserted in or exposed from a housing of the electronic device;
resizing the display by exposing or inserting the second area according to an enlarging ratio corresponding to the enlarge event or a shrinking ratio corresponding to the shrink event;
displaying content resized according to the enlarging ratio or the shrinking ratio on the resized display;

switching to a first capture mode in a first state in which the first area is exposed and an entirety of the second area is inserted in the housing;

detecting the first touch input corresponding to the enlarge event on the display while displaying the content on the display in the first capture mode;

based on identifying that the enlarging ratio corresponding to the enlarge event is a ratio for a second capture mode among a plurality of capture modes, switching from the first capture mode to the second capture mode;

switching to a second state of resizing the display by exposing a portion of the second area to the outside of the housing or a third state of resizing the display by exposing the entirety of the second area to the outside of the housing according to the enlarging ratio corresponding to the enlarge event; and displaying the content enlarged in the enlarging ratio on the resized display in the second capture mode of the second state or the second capture mode of the third state.

10. The method of claim 9, further comprising:

detecting the first touch input corresponding to the enlarge event on the display while displaying the content on the display in the first state in which the first area is exposed and the entirety of the second area is inserted in the housing;

switching to the second state of resizing the display by exposing the portion of the second area to the outside of the housing or the third state of resizing the display by exposing the entirety of the second area to the outside of the housing according to the enlarging ratio corresponding to the enlarge event; and displaying the content enlarged in the enlarging ratio on the resized display in the second state or the third state.

11. The method of claim 9, further comprising:

detecting the second touch input corresponding to the shrink event on the display while displaying the content on the display in the third state in which the first area is exposed and the entirety of the second area is exposed to the outside of the housing;

switching to the second state or the first state; and displaying the content shrunken in the shrinking ratio on the resized display in the second state or the first state.

12. The method of claim 9, further comprising:

switching to the second capture mode in the third state in which the first area is exposed and the entirety of the second area is exposed to the outside of the housing;

detecting the second touch input corresponding to the shrink event on the display while displaying the content on the display in the second capture mode and, based on identifying that the shrinking ratio corresponding to the shrink event is a ratio for the first capture mode, switching from the second capture mode to the first capture mode;

switching to the second state of resizing the display by inserting the portion of the second area into the inside of the housing or the first state of resizing the display by inserting the entirety of the second area into the inside of the housing according to the shrinking ratio; and displaying the content shrunken in the shrinking ratio on the resized display in the first capture mode of the second state or the first capture mode of the first state.

* * * * *